United States Patent
Blodgett et al.

(10) Patent No.: US 10,458,385 B2
(45) Date of Patent: Oct. 29, 2019

(54) SYSTEMS AND METHODS FOR TIDAL ENERGY CONVERSION AND ELECTRICAL POWER GENERATION USING A ROTATABLE DRAG PANEL

(71) Applicant: BIG MOON POWER, INC., Salt Lake City, UT (US)

(72) Inventors: Lynn Blodgett, Salt Lake City, UT (US); Colin Bagley, Salt Lake City, UT (US); Jeff Blodgett, Salt Lake City, UT (US)

(73) Assignee: Big Moon Power, Inc., Salt Lake City, UT (US)

( * ) Notice: Subject to any disclaimer, the term of this patent is extended or adjusted under 35 U.S.C. 154(b) by 0 days.

(21) Appl. No.: 15/582,416

(22) Filed: Apr. 28, 2017

(65) Prior Publication Data
US 2018/0313322 A1   Nov. 1, 2018

(51) Int. Cl.
*F03B 13/26* (2006.01)
*H02K 7/18* (2006.01)

(52) U.S. Cl.
CPC .......... *F03B 13/262* (2013.01); *F03B 13/264* (2013.01); *H02K 7/1823* (2013.01); *F05B 2270/20* (2013.01)

(58) Field of Classification Search
CPC .... F03B 13/262; F03B 13/264; H02K 7/1823
(Continued)

(56) References Cited

U.S. PATENT DOCUMENTS 1,722,516 A   7/1929   Cook
1,808,599 A   6/1931   Galeazzi
(Continued)

FOREIGN PATENT DOCUMENTS

DE   29 05 157   8/1980
DE   10 2012 106009   1/2014
(Continued)

OTHER PUBLICATIONS

International Search Report and Written Opinion from related PCT Appl. No. PCT/US2016/030294 dated Nov. 3, 2016, 23 pages.
(Continued)

*Primary Examiner* — Viet P Nguyen
(74) *Attorney, Agent, or Firm* — Cadwalader, Wickersham & Taft LLP

(57) ABSTRACT

Assemblies, systems, and methods are disclosed for generating energy from natural and renewable forces and, more particularly, to energy generation using tidal action. A tidal energy conversion assembly includes a displacement vessel coupled via an anchor cable to a directional converter and an electrical power generator on land. The displacement vessel includes a horizontally rotatable drag panel extending into the water to capture drag forces caused by the flow of water. The flow of water against the drag panel causes the displacement vessel to move laterally and pull on the anchor cable thus exerting a force on the directional converter. The directional converter converts this force into rotational energy that may be harnessed by the electrical power generator to generate electricity for consumption. The horizontally rotatable drag panel may be rotated to adjust the amount of electrical energy produced.

51 Claims, 23 Drawing Sheets

(58) Field of Classification Search
USPC .................................................. 290/42, 53
See application file for complete search history.

(56) References Cited

U.S. PATENT DOCUMENTS

| | | | |
|---|---|---|---|
| 3,126,557 | A | 3/1964 | Stevens |
| 4,288,985 | A | 9/1981 | Dyck |
| 5,215,406 | A | 6/1993 | Hudson |
| 5,426,332 | A | 6/1995 | Ullman et al. |
| 5,872,406 | A | 2/1999 | Ullman et al. |
| 7,492,054 | B2 | 2/2009 | Catlin |
| 7,513,711 | B1 | 4/2009 | Walter |
| 8,102,071 | B2 | 1/2012 | Catlin |
| 8,246,293 | B2 | 8/2012 | Landberg |
| 8,823,196 | B1* | 9/2014 | Gehring ............. F03B 13/1885 290/42 |
| 2008/0084067 | A1* | 4/2008 | Hill ..................... F03B 13/264 290/4 R |
| 2008/0238102 | A1* | 10/2008 | Wegener ................ F03B 13/16 290/53 |
| 2010/0032951 | A1* | 2/2010 | Collee ..................... B63B 21/00 290/53 |
| 2010/0132353 | A1* | 6/2010 | Kelly ..................... F03B 13/16 60/497 |
| 2010/0140944 | A1* | 6/2010 | Gardiner ................ F03B 13/16 290/53 |
| 2010/0176595 | A1* | 7/2010 | Bear ..................... F03B 13/264 290/53 |
| 2011/0068579 | A1* | 3/2011 | Dullaway ........... F03B 13/1815 290/53 |
| 2011/0101697 | A1* | 5/2011 | Power, III ............... B63B 35/44 290/54 |
| 2011/0221199 | A1* | 9/2011 | Boyce ..................... F03B 13/20 290/53 |
| 2013/0009402 | A1* | 1/2013 | Williams ............. F03B 13/182 290/53 |
| 2013/0134714 | A1 | 5/2013 | Daqian |
| 2013/0200626 | A1* | 8/2013 | Sidenmark .......... F03B 13/1885 290/53 |
| 2013/0269333 | A1* | 10/2013 | Williams ............. F03B 13/182 60/506 |
| 2013/0300122 | A1 | 11/2013 | Grubel |
| 2014/0117671 | A1* | 5/2014 | Gregory ................. F03B 13/22 290/53 |
| 2015/0021918 | A1* | 1/2015 | Greco ............... F03B 13/1815 290/53 |
| 2015/0183516 | A1 | 7/2015 | Vander Lind |
| 2016/0013703 | A1 | 1/2016 | Marzelius et al. |
| 2016/0319798 | A1* | 11/2016 | Blodgett ............... F03B 13/262 |
| 2019/0040841 | A1* | 2/2019 | Maramara ........... F03B 13/1815 |

FOREIGN PATENT DOCUMENTS

| | | |
|---|---|---|
| GB | 2 479 348 | 10/2011 |
| JP | 2007-512469 | 5/2007 |
| KR | 10-2014-0141157 | 12/2014 |
| WO | WO 2010/067341 | 6/2010 |
| WO | WO 2011/024209 | 3/2011 |
| WO | WO 2011/116100 | 9/2011 |
| WO | WO 2012/054152 | 4/2012 |
| WO | WO 2014/120058 | 8/2014 |

OTHER PUBLICATIONS

Partial International Search Report from related PCT Appl. No. PCT/US2016/030294 dated Jul. 22, 2016, 4 pages.

* cited by examiner

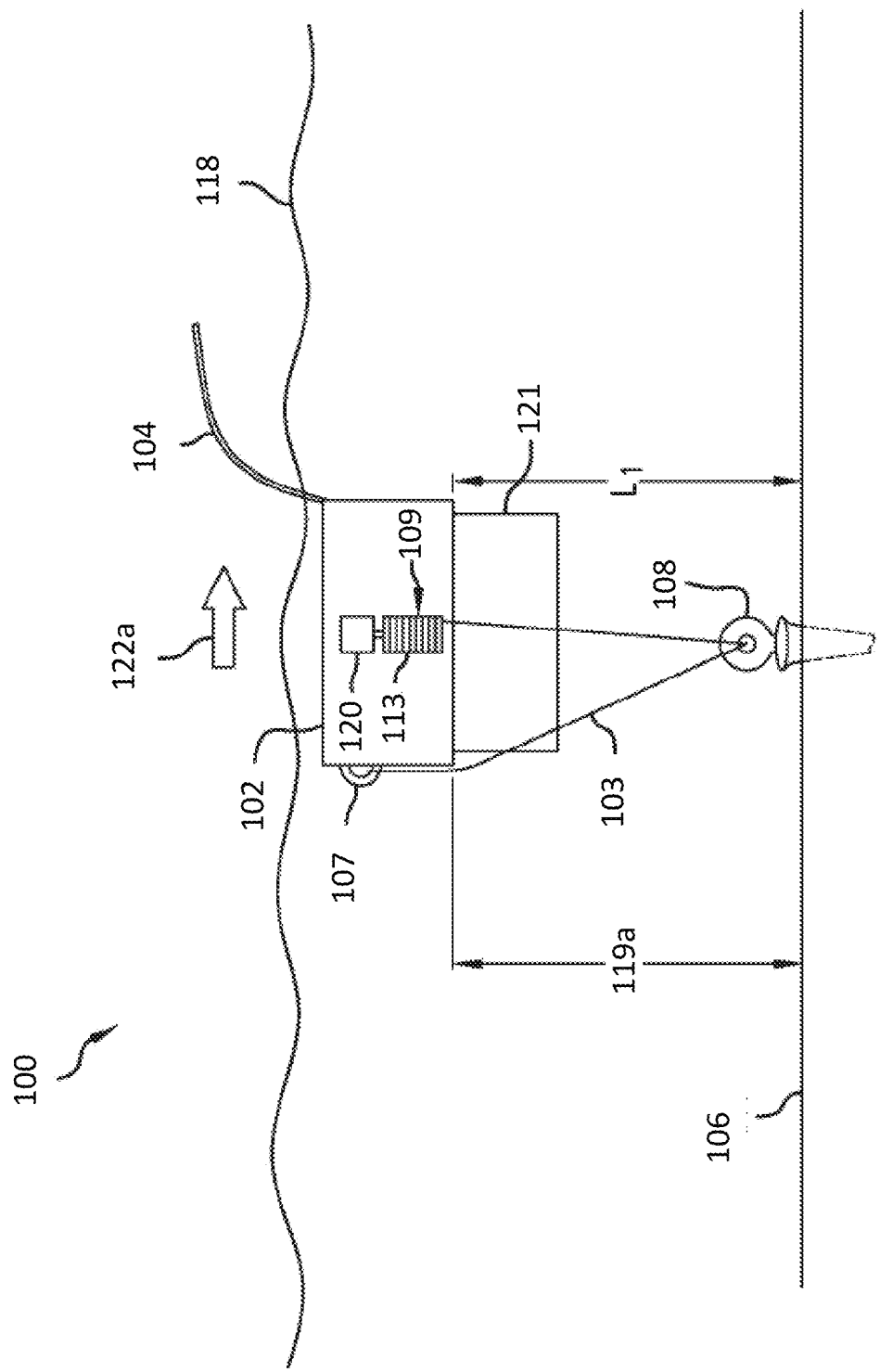

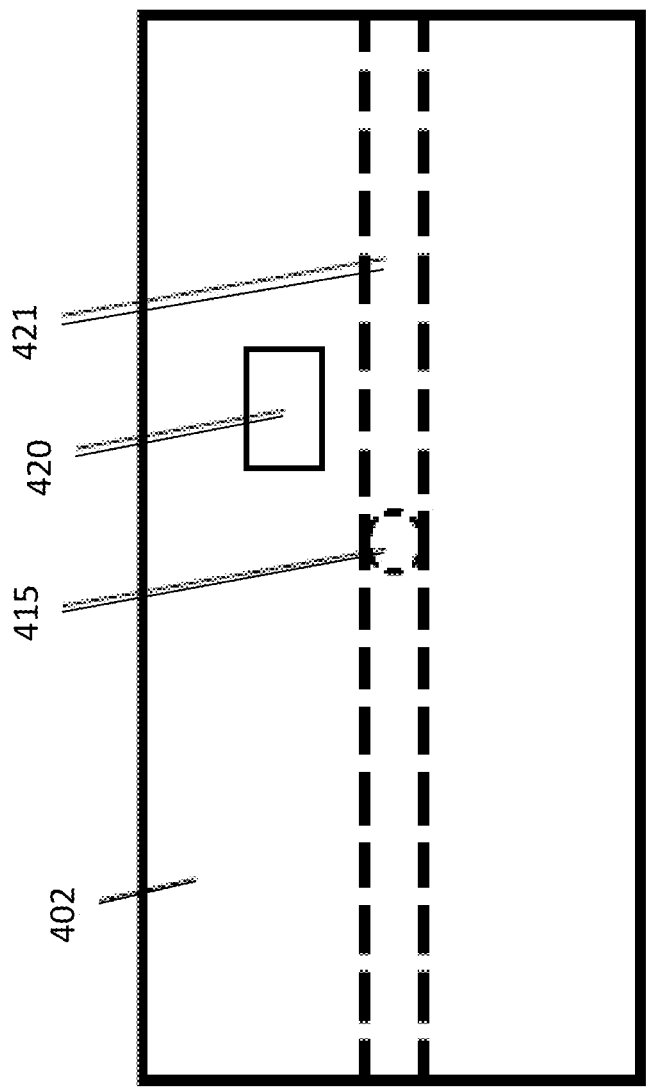

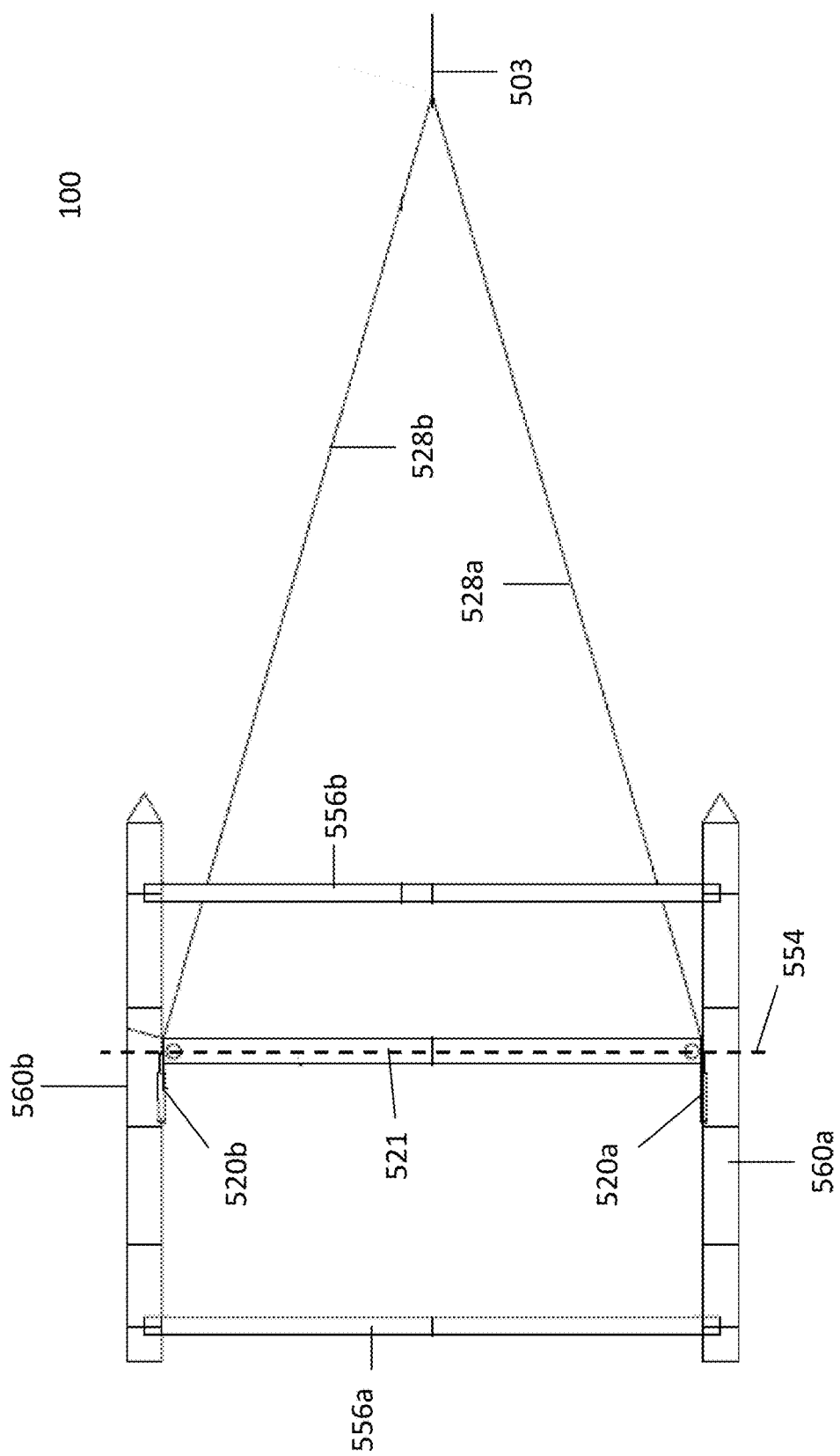

SYSTEMS AND METHODS FOR TIDAL ENERGY CONVERSION AND ELECTRICAL POWER GENERATION USING A ROTATABLE DRAG PANEL

FIELD OF THE INVENTION

The present invention relates to a system and method for generating electrical power from renewable energy sources such as naturally occurring forces and, more particularly, to electrical energy generation from tidal actions using a rotatable drag panel. In particular, the present disclosure illustrates a system and method for converting kinetic energy from ocean tidal movements—specifically, the lateral ebb and flow of water caused by the constant and repeating pattern of tidal changes—into electrical energy or power that can be stored and/or consumed. The systems and methods of the present invention also relate to adjusting the amount of kinetic energy converted into electrical energy.

BACKGROUND

Notwithstanding the significant drop in crude oil prices during 2014-15, the long term trend in fossil fuel prices is likely to increase due to diminishing global oil and gas reserves, alternative (preferably renewable) energy generation systems have become an increasingly significant topic of interest for countries around the world, particularly as fossil fuel production threatens to continue unabated. As a result, significant time, resources, and funding have been invested to research and develop alternative electrical energy generation systems utilizing such renewable sources as solar power, water flow, wind power and the like to supply ever-increasing amounts of energy. One relatively untapped renewable energy source receiving increased attention is the potential energy that might be harnessed from ocean movement, such as the potentially endless energy source inherent in the constant tidal, wave, and/or current flows of the ocean.

The potential for generating electrical energy from the action of ocean phenomena generally comes in three sources: ocean thermal power, wave power, and tidal power. Ocean thermal power generation takes advantage of the difference in temperature between cooler deep water and warmer surface water that becomes heated by the sun; that thermal differential is then used to operate a heat engine for generating electricity. Ocean thermal power generation, however, is expensive, has very low thermal efficiencies, and may require equipment that can be an eye sore if located near populated areas. Furthermore, ocean thermal power generation requires large temperature gradients or differentials to function adequately. In many areas of the ocean, the actual thermal differential is not large enough to generate significant amounts of electrical energy to meet demand.

Wave power generation takes advantage of the waves generated on the ocean surface when wind interacts at the free surface of the water. Wave power generation is, however, highly dependent on wavelength and thus only suitable to specific locations of the ocean where large wavelengths are present. Wave power is also unreliable because wave quality is irregular and difficult to forecast, leading to unreliable energy generation. Similar to ocean thermal power, wave power may cause noise or visual pollution if wave energy generators are located near a populated area.

Tidal power generation techniques are expected to take advantage of the differences in the surface level of an ocean or similar body of tidal water due to the gravitational effects of the moon. The vertical difference in the surface level during tidal changes represents potential energy that holds promise for electrical power generation, and is particularly desirable because it follows a relatively regular pattern. Technology using tidal action as a source for energy generation is still in its relative infancy. One known tidal energy generation system utilizes large turbines placed in tidal streams in order to take advantage of the flow of water during tidal changes. A tidal stream is a relatively fast-flowing body of water that is created by the rising and falling of the tide; the turbines are positioned to capture the horizontal flow of water and thereby generate electricity. The fast-flowing water is thus directed through the turbine, which rotates a shaft attached to a magnetic rotor that converts the mechanical energy into electrical energy. These turbines are relatively expensive and may also require significant maintenance over their lifetime, thus increasing operating costs.

Another known method of harnessing tidal energy involves the use of a barrage. A barrage is a large dam where water spills over the dam as the tide rises. The overflowing water may be passed through a turbine, which rotates a shaft attached to a magnetic rotor that converts the mechanical energy into electrical energy. This process of using a barrage suffers from similar downsides as the tidal stream process and is limited to areas where a dam may be constructed such as tidal rivers, bays, and estuaries.

Other known tidal energy systems require the construction and placement of machinery such as hydraulics and moveable tanks that extend far above the surface of the water, such as described in U.S. Pat. Nos. 5,426,332, 5,872,406, and U.S. Patent Application Publication No. 2013/0134714. As another example, a known tidal energy system may require the construction of a large reservoir on land that must be filled so that a large duct system may capture the flow of water, as described in U.S. Pat. No. 4,288,985. Such tidal energy systems require large structures that are built either above the water or on shore, requiring significant costs in engineering and land.

Prior tidal energy generation systems, such as the tidal energy generation systems described in U.S. patent application Ser. No. 15/143,440 (which is hereby incorporated by reference in its entirety), include assemblies for capturing energy from the vertical rising and falling of the tide using a buoyant displacement vessel and converting the energy into electrical power using a directional converter mounted on the displacement vessel. Other tidal energy generation systems include assemblies for capturing energy from the lateral ebb and flow of the tide using a buoyant displacement vessel having an immobile drag panel extending into the water and converting the energy into electrical power using a directional converter positioned at a stationary location, such as land. In such an arrangement, it may be experienced that tidal energy generation systems having immobile drag panels are difficult to rewind after having drifted out in a particular direction away from the stationary location. Moreover, the amount of electrical power generated may be proportional to the speed of the water current and this amount may not be capable of being adjusted based on electrical power demand of consumers.

Present electrical supply infrastructure does not have the capability to store electricity, so electricity must be supplied as it is demanded. If more electricity is supplied than is demanded, the excess electricity goes to waste. A need therefore exists for an efficient and cost-effective energy conversion/electrical power generation system that can capture the kinetic energy of tidal action as the water ebbs and flows due to changing tidal action and adjust the amount of kinetic energy captured by the drag panel to produce a specific amount of electrical power from the captured energy to meet consumer demand for electrical power.

SUMMARY OF THE INVENTION

Disclosed herein is a novel tidal energy conversion assembly and method for generating electricity. Generally, the tidal energy conversion assembly may generate energy utilizing drift/drag forces from the ebb and flow of the tide and/or currents. In an aspect of the invention, the tidal energy conversion assembly may include a displacement vessel having a drag panel that is rotatable about a horizontal axis. In an embodiment, the displacement vessel may include a drag panel that is rotatable about the horizontal axis by a control mechanism. The control mechanism may be, for example, a motor, a winch, a hydraulic mechanism, or a pneumatic mechanism. In an embodiment, two or more control mechanisms may be used to rotate the drag panel about the horizontal axis. The drag panel may be coupled to the displacement vessel about the horizontal axis of rotation. In an embodiment, the drag panel may include arms extending therefrom connecting the control mechanisms to the drag panel. In another embodiment, the drag panel may include a counterweight to assist in the horizontal rotation of the drag panel.

In another embodiment, the horizontally rotatable drag panel may include one or more vertically rotatable sub panels. The vertically rotatable sub-panels may be used to reduce the force necessary to retract the entire drag panel about the horizontal axis. In an example, before retracting the drag panel, the vertically rotatable sub-panels may be rotated (preferably by 90 degrees) and then the entire drag panel may be retracted out of the water. Alternatively, the vertically rotatable sub-panels may be used for steering purposes or to adjust the amount of drag force experienced by drag panel (and thus, electricity generated by the directional converter at the stationary location).

A tidal energy conversion assembly may include a displacement vessel, a drag panel coupled to the displacement vessel that is rotatable about a horizontal axis, a directional converter coupled to a generator positioned at a stationary location, and an anchor cable having a first end, a second end, and a length in between the first end and the second end. The directional converter may activate the generator to generate electricity when the displacement vessel changes its position relative to the stationary location. In an embodiment, the displacement vessel may include floatation devices connected by transverse members to create a frame from which to hold the rotatable drag panel as the displacement vessel floats in the water. Any number of floatation devices may be used to maintain buoyancy of the displacement vessel and to hold the weight of the drag panel in the water. In an embodiment, the floatation devices are pontoons. In another embodiment, the floatation devices may have a tubular or cylindrical shape.

The present disclosure provides for a method of generating electricity using the flow of water due to tidal action. The method includes releasing a displacement vessel having a drag panel rotatable about a horizontal axis of the displacement vessel, wherein the drag panel extends at an angle from a surface of the water. In an embodiment, the drag panel may extend vertically into the water. The method further includes generating electricity as the displacement vessel travels due to the flow of water.

The present disclosure also provides for a method of adjusting the amount of drag force experienced by a drag panel of a displacement vessel. The method includes releasing the displacement vessel in a body of water and rotating the drag panel by an angle about a horizontal axis of the displacement vessel to thereby adjust the amount of drag force experienced by the drag panel. In an embodiment, the angle is greater than 0 degrees and less than or equal to 90 degrees. In an embodiment, decreasing the angle between the drag panel and the horizontal axis decreases the amount of drag force experienced by the drag panel. In an embodiment, increasing the angle between the drag panel and the horizontal axis increases the amount of drag force experienced by the drag panel.

A tidal energy conversion system may include a plurality of the foregoing assemblies of displacement vessels and directional converters in order to increase the potential for power generation, using one or a plurality of generators.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout. It will be appreciated that certain reference characters herein have been changed from the priority provisional applications to provide better correspondence among analogous structures.

FIGS. 1A-1C show a tidal energy conversion assembly having a directional converter comprising a drag energy converter.

FIG. 4A shows an exemplary displacement vessel having a vertically rotatable drag panel.

FIGS. 5A-5C show an exemplary displacement vessel having a horizontally rotatable drag panel.

DETAILED DESCRIPTION OF THE INVENTION

Figure 1B:
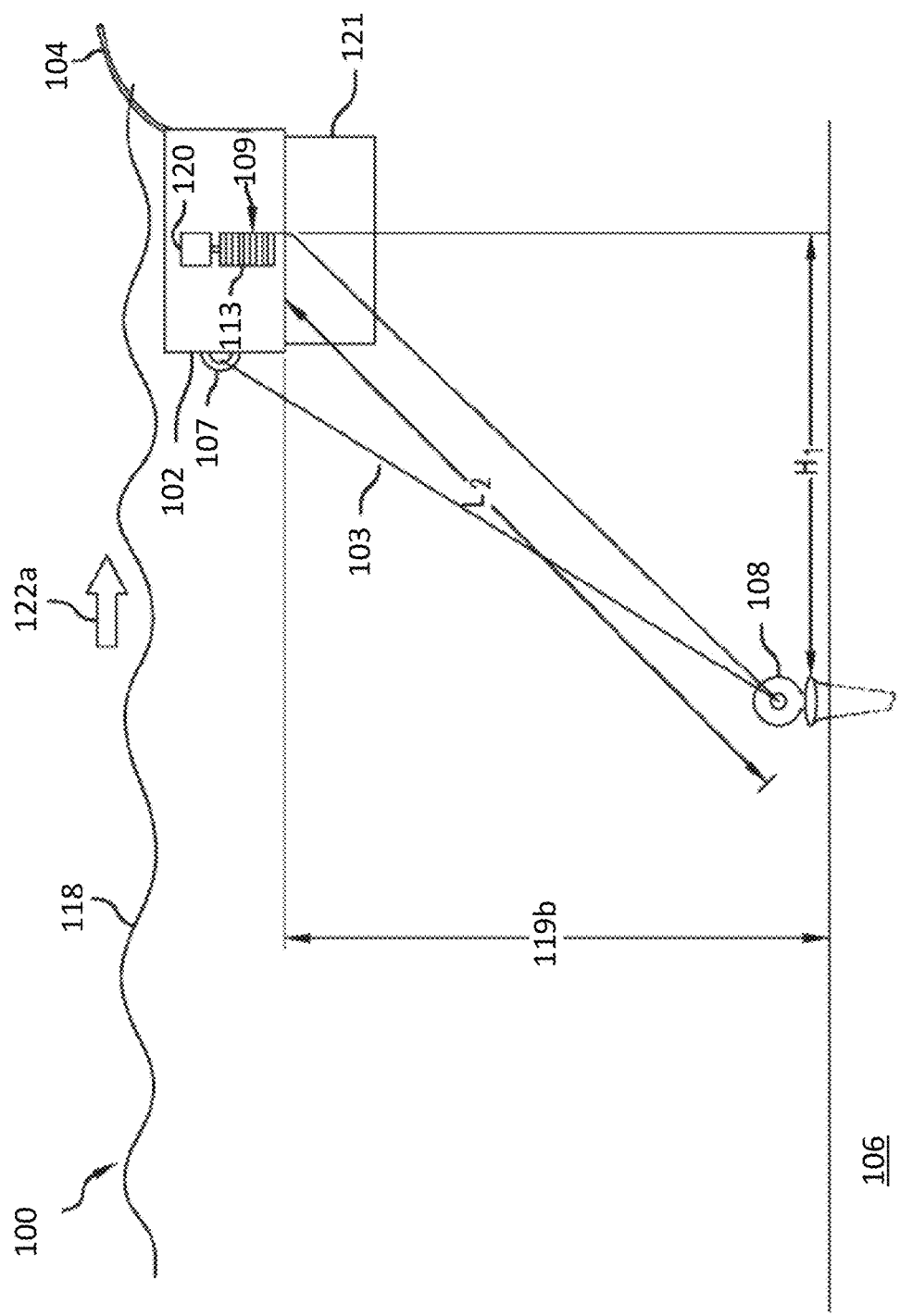

A tidal energy conversion device of the present invention generally includes a displacement vessel having a drag panel that is rotatable about a horizontal axis. The displacement vessel structure may include one or more buoyant floatation devices that are connected via transverse members to create a frame from which to hold the drag panel as the displacement vessel floats in the water. In an embodiment, the floatation devices are pontoons. In another embodiment, the floatation devices have a tubular or cylindrical shape. The drag panel may be coupled to the displacement vessel at an axis of rotation, such as the horizontal axis. In an embodiment, the drag panel may be disposed between two buoyant floatation devices and connected thereto to form the displacement vessel.

The drag panel generally extends from the displacement vessel in a generally downwards direction (into the water) in order to capture drag forces caused by the flow of water. As explained above, the drag panel is rotatably coupled to the displacement vessel via the floatation devices along a horizontal axis such that the drag panel may freely rotate about the horizontal axis from an active configuration (e.g., drag panel in the water) to a retracted configuration (e.g., drag panel out of the water).

In an embodiment, the displacement vessel may include a drag panel that is rotatable about the horizontal axis by a control mechanism. The control mechanism may be, for example, a motor, a winch, a hydraulic mechanism, a pneumatic mechanism, or any other suitable control mechanism as is known in the art. In an embodiment, two or more control mechanisms may be used to rotate the drag panel about the horizontal axis. In an embodiment, the drag panel may include arms extending therefrom connecting the control mechanisms to the drag panel to provide a lever from which the control mechanism may rotate the drag panel. In another embodiment, the drag panel may include a counterweight to assist in the horizontal rotation of the drag panel.

In another embodiment, the horizontally rotatable drag panel may include one or more vertically rotatable sub panels. The vertically rotatable sub-panels may be used to reduce the force necessary to retract the entire drag panel about the horizontal axis. In an example, before retracting the drag panel, the vertically rotatable sub-panels may be rotated (preferably by about 90 degrees) and then the entire drag panel may be retracted out of the water. Alternatively, the vertically rotatable sub-panels may be used for steering purposes or to adjust the amount of drag force experienced by drag panel (and thus, electricity generated by the directional converter at the stationary location).

The horizontally rotatable drag panel and horizontally rotatable drag panel with vertically rotatable sub-panels embodiments of the present invention may be applied to any of the below devices, systems, and assemblies of displacement vessels having drag panels, such as the displacement vessels detailed in FIGS. 1 and 3-8.

The drag panel generally increases the surface area upon which drag forces act due to the ebb and flow caused by tidal action (or drag forces caused by other ocean currents), allowing the displacement vessel to be more effectively moved by the drag forces caused by the ebb and flow of the water. The drag panel may have a height that is between 1 ft and 100 ft, and preferably extends the entire width of the displacement vessel. The thickness of the drag panel may be between 0.1 inch and 24 inches; however, one skilled in the art will recognize that any suitable thickness may be used. In an example, the drag panel may be fabricated from an extruded metal sheet panel or other durable structure.

Generally, the tidal energy conversion assembly includes a directional converter for converting the lateral motion of the displacement vessel into electrical power. The directional converter may be housed on the displacement vessel or located away from the displacement vessel, such as on land. As an example of the operative coupling, the directional converter may include a rotatable drum fixed on an axle, with at least a portion of the anchor cable wrapped around the drum. The displacement vessel may be coupled by one or more anchor cables to one or more directional converters positioned at a stationary location, such as land, for example. The stationary location may be a bay/ocean floor, a barge, a pier, a platform, or any other suitable location. Each of the directional converters may include a drum around which the anchor cables are wound, a gear box operatively coupled to the drum, and a generator operatively coupled to the gear box. Thus, the displacement vessel may be attached to an array of generators. The generators may have similar electrical output ratings or may have different electrical output ratings. If different electrical output ratings are used, each of the generators may be controllably engaged or disengaged based on, for example, the speed of the current.

In this instance, as the ebb and flow of the tide causes the displacement vessel to drift in a lateral direction relative to the stationary location, the anchor cable causes the drum to rotate as the anchor cable unwinds and the resulting mechanical energy (e.g., rotational kinetic energy) of the directional converter is transmitted to the generator for producing electrical energy.

Generally, the directional converter may utilize a gearing mechanism having at least one sprocket on an axle or a spindle, and a gear box. The gear box converts an input rotations per minute (RPM) into an output RPM that is different than (preferably greater than) the input RPM to increase the rotational energy transmitted to the generator. This may be accomplished by using a series of gears of differing radii coupled to one another or via a chain, for example. The gearing mechanism or alternatively, the gear box, may include a gear multiplication arrangement in order to increase the output RPM of the directional converter and applied to the generator.

The generator may include a fixed magnet (or permanent magnet) generator. A fixed magnet generator includes a permanent magnet fixed to a shaft and housed within a stationary armature. The armature includes one or more metal wires/coils within the magnetic field of the permanent magnet such that, upon rotation of the permanent magnet, an electric current is induced in the wires. A fixed magnet generator may be suitable for generating electricity using a lower rotational speed, such as a rotational speed of under 1000 RPM, for example. As another embodiment, the generator may include any suitable electrical generator as is known in the art, including but not limited to an induction generator (e.g., a doubly-fed induction generator or permanent magnet generator) or other electric generator.

Figure 10:
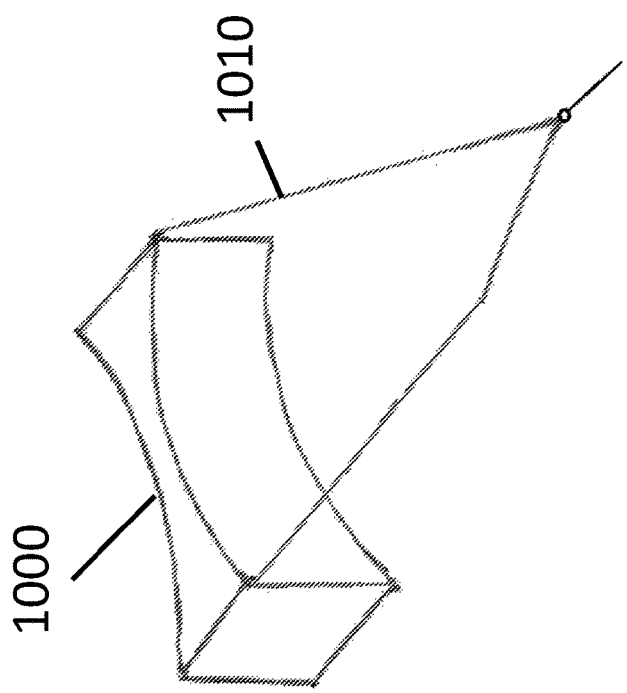
FIG. 10 shows a drag panel having a concave shape connected to control cables.

Generally, the tidal energy generation assembly may include a displacement vessel that is rotatably coupled by an anchor cable to a directional converter positioned at a stationary location, such as land, for example. Because the speed and direction of water varies during a tidal cycle, the displacement vessel may require rotation to maintain a generally perpendicular orientation with respect to the flow of water. This orientation capability may be achieved by a series of control cables attached to the displacement vessel—forming, e.g., a "bridle"—such that the displacement vessel may capture both directions of water flow. The control cables allow the displacement vessel to rotate about a vertical axis and thus capture drag forces from the flow of water in multiple directions. Additionally, the displacement vessel may rotate such that it operates at an angle to the direction of water flow to adjust the amount of drag force exerted on the displacement vessel, and thus adjust the amount of electricity generated at the generator. The displacement vessel includes a drag panel supported by one or more floatation devices configured to float at or near the surface of the water. The drag panel may include one or more non-flat sides configured to capture drag forces more effectively than a flat side. In an example, the sides of the drag panel may include a parabolic shape, a concave shape, or a lofted cut. In light of the foregoing, a skilled person will appreciate that other shapes may be appropriate to use. FIG. 10 shows a drag panel 1000 having a concave shape connected to control cables 1010. For ease of illustration, other components of the displacement vessel are not shown in FIG. 10.

The bridle may include any suitable number of control cables (e.g., two, four, eight, etc.) and each control cable may be connected to the displacement vessel at a connection point. Exemplary connection points along the displacement vessel may include the ends or sides of the displacement vessel. For potentially maximum adjustability to the angle of motion, a 4-point harness can be used so that the drag panel can be rotated about a vertical axis and one or more horizontal axis. Redundant cables (and control mechanisms) may be used to create an 8-point harness to improve reliability and/or adjustability of the system. The displacement vessel may further house a control mechanism, such as a motor, a winch, or a drum and spring affixed to an axle, for example, to wind up and/or release the control cables and effect rotation of the displacement vessel.

In addition, with suitable placement of anchored cables on generally opposite sides of the assembly, electrical power generation may be produced as the assembly moves in both directions (incoming and outgoing tides)—i.e., the cables can be mounted on different drums on the directional converter such that as one cable unwinds and operates the generator, the other cable is being re-wound for the next tidal cycle.

A method of generating electricity using the flow of water due to tidal action may include releasing a displacement vessel having a drag panel rotatable about a horizontal axis of the displacement vessel, wherein the drag panel extends at an angle from a surface of the water. In an embodiment, the drag panel may extend vertically into the water. The method further includes generating electricity as the displacement vessel travels due to the flow of water.

A method of adjusting the amount of drag force experienced by a drag panel of a displacement vessel may include releasing the displacement vessel in a body of water and rotating the drag panel by an angle about a horizontal axis of the displacement vessel to thereby adjust the amount of drag force experienced by the drag panel. In an embodiment, the angle is greater than 0 degrees and less than or equal to 90 degrees. In an embodiment, decreasing the angle between the drag panel and the horizontal axis decreases the amount of drag force experienced by the drag panel. In an embodiment, increasing the angle between the drag panel and the horizontal axis increases the amount of drag force experienced by the drag panel.

A tidal energy conversion system may include a plurality of the foregoing assemblies of displacement vessels and directional converters in order to increase the potential for power generation, using one or a plurality of generators.

Figure 1C:
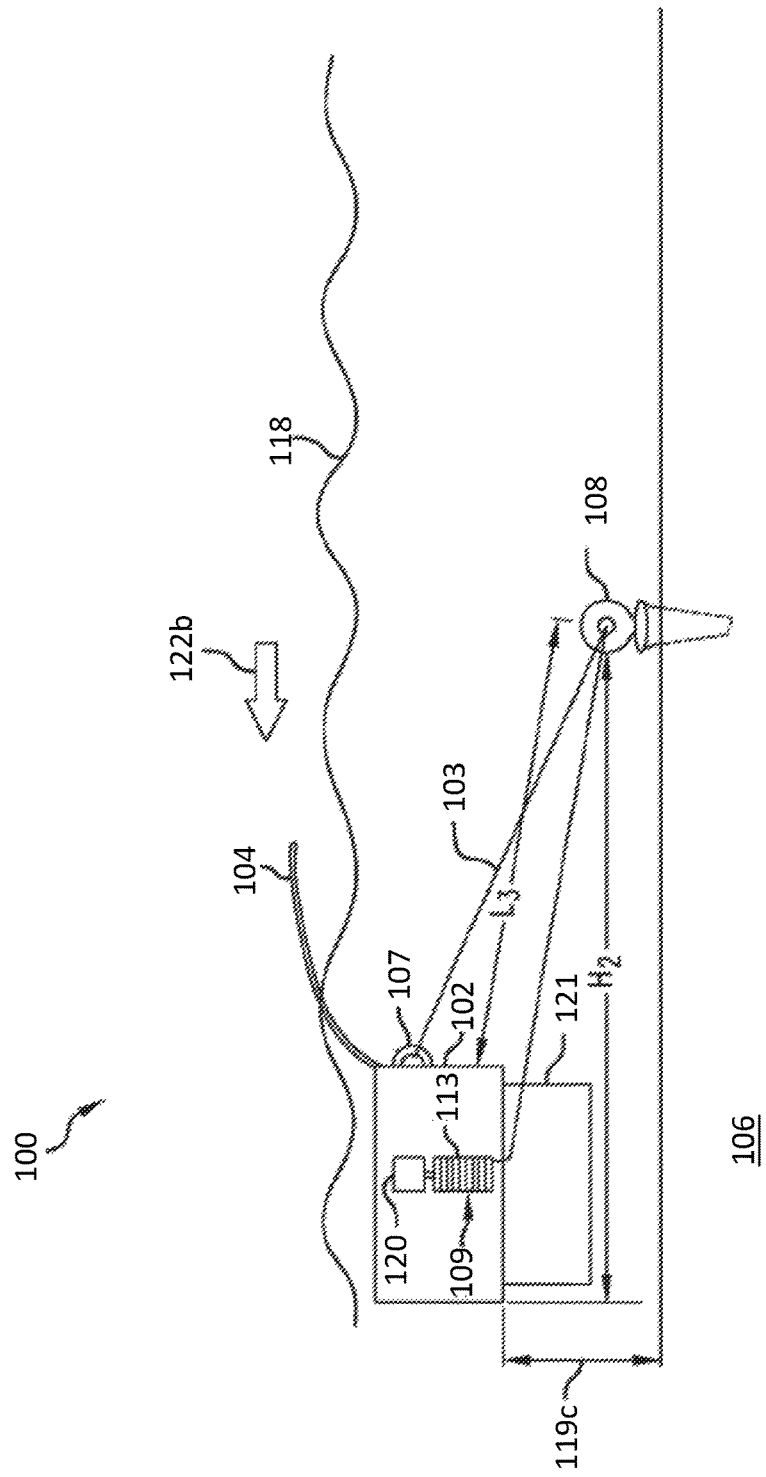

FIGS. 1A-1C show a tidal energy conversion assembly 100 having a displacement vessel 102 that is buoyant at the surface 118 of the water and houses or supports a directional converter 109. Generally, the directional converter 109 is capable of capturing the drag—or "drift"—of the tidal energy conversion assembly caused by the ebb and flow of water due to tidal action. The displacement vessel 102 is anchored to the stationary location 106 at anchor 108 by anchor cable 103. The directional converter 109 may comprise any of the embodiments described and shown below, for example, FIGS. 2A-2C. The displacement vessel 102 further includes an electric power generator for generating electricity from the drag. The anchor cable 103 has a first end at latch 107 and a second end connected to directional converter 109, defining a length therebetween. Anchor cable 103 is threaded through the anchor 108 (which can be either a loop or a pulley).

Figure 2A:
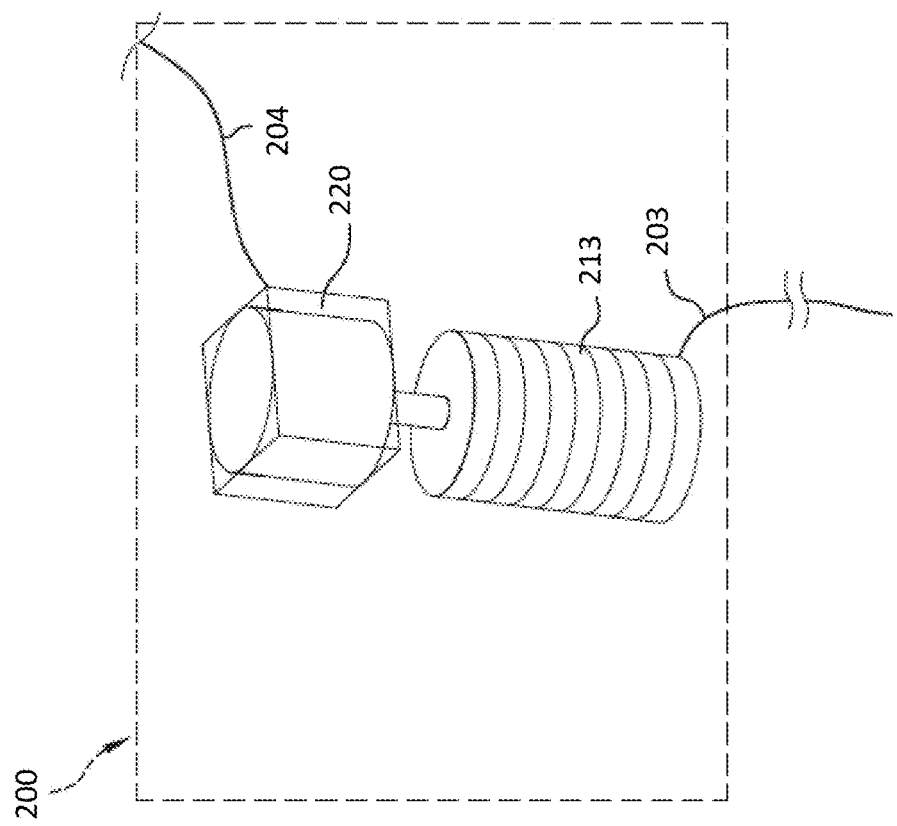
FIGS. 2A-2C shows an exemplary directional converters.

Generally, the directional converter 109 includes a drum 113 and control mechanism 120. FIG. 2A shows an enlarged view of the directional converter 109 configured for drag energy conversion.

In FIG. 1A, displacement vessel 102 is resting at a point directly above anchor 108 at a distance $119a$ above the anchor 108. Anchor cable 103 has a length $L_1$ from displacement vessel 102 to anchor 108. Tidal drag forces may shift displacement vessel 102 in a lateral direction $122a$ with respect to its original position. When the tide rises vertically as shown in FIG. 1B, displacement vessel 102 rises to a distance $119b$, which is greater than distance $119a$, and the tide pushes the displacement vessel 102 a lateral distance of $H_1$. The anchor cable 103 increases to a length of $L_2$ between the displacement vessel 102 and anchor 108. $L_2$ is greater than $L_1$ and $119b$ is greater than $119a$. The increase in distance of $L_1$ to $L_2$ causes the drum 113 of the directional converter 109 to rotate. This rotation of the spindle can be transmitted to an electrical power generator to generate electricity. As the tide returns, the displacement vessel 102 returns to the position over anchor 108, for example, by the use of a positioning system on the displacement vessel 102. Slack in the anchor cable 105 may be brought into and stored within the displacement vessel 102 by a control mechanism 120, e.g., a motor or a spring coupled to the drum 113.

In FIG. 1C, the displacement vessel 102 is resting at a low point in the tidal cycle at a distance $119c$ between the displacement vessel 102 and the anchor 108. and anchor cable 103 has a length $L_3$ from the displacement vessel 102 to the anchor 108. When the tide falls vertically as shown in FIG. 1C, the tides drags the displacement vessel 102 a lateral distance of $H_2$ in direction $122b$ and the displacement vessel 102 falls vertically to a distance $119c$. The length $L_3$ may increase in length due to the falling tide Where $L_3$ is greater than $L_1$, the increase in length from $L_1$ to $L_3$ causes the drum 113 of the directional converter 109 to rotate. The rotation can be captured by an electrical power generator to generate electricity. As the tide returns, the displacement vessel 102 returns to the position over anchor 108, for example, by the use of a positioning system on the displacement vessel 102. Any slack in the anchor cable may be returned to the drum 113 by a control mechanism 120.

Generally, the displacement vessel 102 is capable of connecting, disconnecting, and/or reconnecting to different locations (e.g., different anchors) along the seabed as the displacement vessel drifts in a lateral direction relative to a first stationary location on the seabed. Initially, the displacement vessel 102 may be anchored to the first stationary location along the seabed by a first anchor cable attached to a first anchor. As the displacement vessel 102 moves in a lateral direction due to the ebb and flow of water during tidal action, the anchor cable 103 may disconnect from the first anchor and reconnect to a second location, such as a second anchor, along the seabed closer to the drifted-to location of the displacement vessel. To do so, the anchor cable may include a connection mechanism at an end of the anchor cable that connects the anchor cable to the first anchor attached to the seabed. The connection mechanism on the end of the anchor cable may disconnect from the first anchor, translate relative to the seabed via a linking mechanism, such as a guide cable or chain, and then reconnect to the second anchor. For example, the connection mechanism may include a latch, clip, pin, rolling mechanism, and/or lock. The connection mechanism may further include a control mechanism, such as a motor, to assist in the connecting, disconnecting, and/or reconnecting of the anchor cable to various locations on the seabed. The linking mechanism may reconnect the anchor cable to a second anchor (not shown) at the second location.

Generally, the displacement vessel 102 may include a drag panel 121 extending from one of the exterior surfaces of the displacement vessel 102. The drag panel 121 may enhance capture of tidal currents and/or allow for the additional capture of currents that occur deeper in the water, such as undertow. The additional drag that is captured by the drag panel 121 may provide additional forces that can be converted into mechanical energy by the directional converter and ultimately, electricity by the electrical power generator. For example, a drag panel 121 may be secured to a bottom side of the displacement vessel 102 and extend in a generally downwards direction. The drag panel 121 may be substantially parallel to a side of the displacement vessel or at an angle relative to a side of the displacement vessel. The drag panel 121 may extend along an entire width of the bottom surface of the displacement vessel or only a portion of the width. Furthermore, the drag panel 121 may include support structures, such as reinforcement bars, that may extend from the displacement vessel to any point on the drag panel 121.

The drag panel 121 may include a control mechanism such that the control mechanism may deploy and retract the drag panel 121 from the displacement vessel. For example, the drag panel 121 may be stored within the displacement vessel in a first stored position. The control mechanism may controllably deploy the drag panel 121 at a specified time, such as a time when strong current conditions exist, to a second deployed position. If the drag panel 121 is not needed, the control mechanism may retract the drag panel 121 back into the first position inside the displacement vessel. The first position may alternatively be a configuration where the drag panel 121 is substantially adjacent to a surface of the displacement vessel 102. The drag panel 121 may be deployed to the second position by rotation about a hinge, where the rotation is controlled by the control mechanism. The control mechanism may include hydraulics or an electric motor that may be powered by the energy generated by the displacement vessel 102.

Figure 1D:
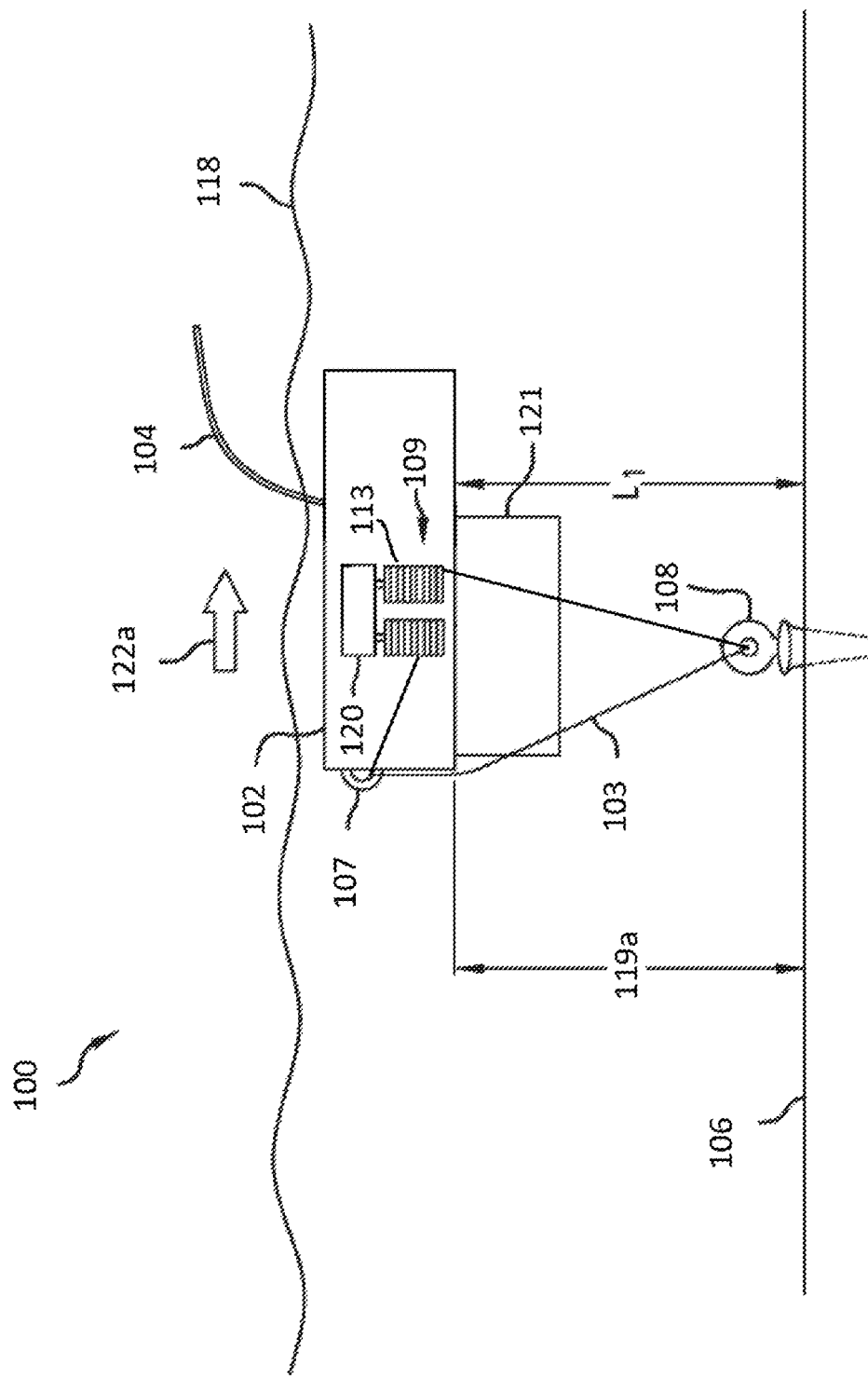
FIG. 1D shows a tidal energy conversion assembly comprising two directional converters.

Generally, the directional converter may include a plurality of drums and a plurality of anchor cables to utilize the lateral motion in multiple directions to generate electricity. The plurality of drums and the plurality of anchor cables may be employed in various orientations in the displacement vessel or outside the displacement vessel such that as one cable unwinds from one drum and operates the electrical power generator, another cable is rewound on a different drum prepping for the next tidal cycle. In this way, a first drum may be engaged with the electrical power generator to produce electricity when the displacement vessel drifts in one direction, and a second drum may be engaged to produce electricity when the displacement vessel drifts in a different direction. This particular configuration of multiple drums housed within or outside the displacement vessel and multiple anchor cables fixed at various locations along the seabed or on land may allow the displacement vessel to take advantage of the lateral motion of the displacement vessel in multiple lateral directions due to the ebb and flow of the water during tidal action. Alternatively, the two drums may be operatively coupled such that the second cable may be automatically rewound on its drum as the cable on the first drum is unwound and thus be ready for unwinding as the displacement vessel moves in the other/opposite direction as shown in FIG. 1D.

For example, two drums—each attached to at least one anchor cable—may be disposed in the displacement vessel such that as the displacement vessel moves laterally in a first direction, a first anchor cable unwinds from the first drum causing the first drum to rotate while a second anchor cable (fixed to a second stationary location) may be reeled into a second drum by, for example, a control mechanism (for example, a spring or motor). The rotation of the first drum due to the first anchor cable unwinding is transferred to an electrical power generator to generate electricity as the displacement vessel moves in the first lateral direction. As the ebb and flow of the water during tidal action cause the displacement vessel to drift in a second lateral direction, the second anchor cable is unwound from the second drum causing the second drum to rotate as the first anchor cable is reeled back into the first drum by a control mechanism as described above. The rotation of the second drum is transferred to the electrical power generator which generates electricity as the displacement vessel moves in the second lateral direction. The second anchor may be reeled back into the second drum when the displacement vessel moves again in the first direction. Thus, electric power can be generated during both general directions of travel.

Figure 2B:
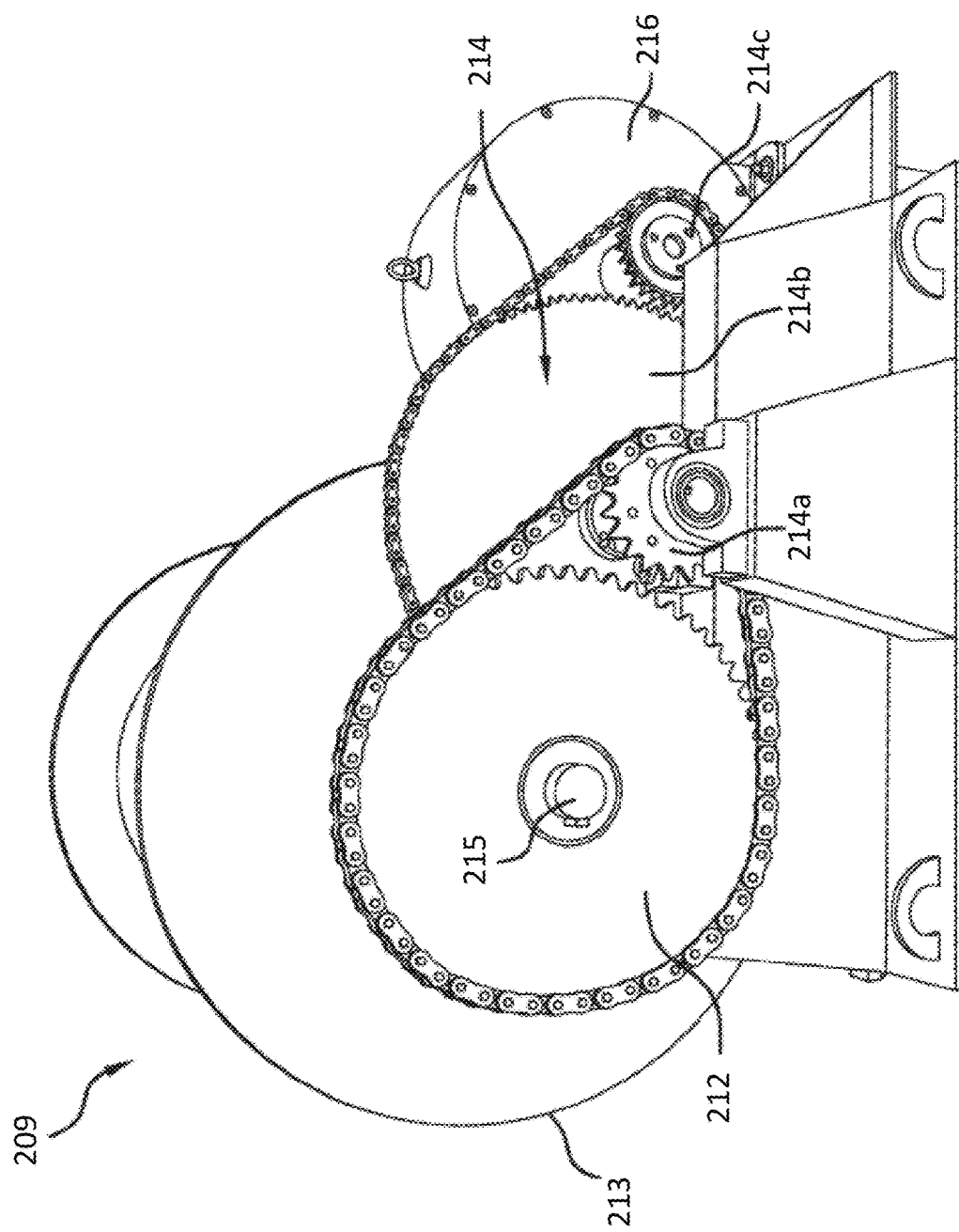

FIG. 2B illustrates a directional converter 209 that may be placed at a stationary location, such as land or a barge. In particular, directional converter 209 includes a rotatable drum 213 fixed on an axle 215. An anchor cable may be coupled to the rotatable drum such that it may be wound about or unwound from the drum 213. A drive gear 212 is also fixed on the same axle 215 as the rotatable drum 213. Drive gear 212 is connected to a gearing mechanism 214 by a chain, for example, and gearing mechanism 214 includes a plurality of gears 214*a*-214*c*. In the directional converter 209, the gearing mechanism 214 is configured as a gear multiplication arrangement. As the drive gear 212 turns at a first RPM, gear 214*a* will turn at a second RPM that is faster than the first RPM because gear 214*a* has a smaller diameter than the drive gear 212. Gear 214*b* is fixed on the same axle as gear 214*a* and thus will also rotate at the second RPM. Gear 214*c* is coupled to gear 214*b* by a chain and will spin at a third RPM that is faster than the second RPM, because the diameter of gear 214*c* is smaller than the diameter of gear 214*b*. The gearing mechanism 214 is also coupled to an electrical power generator 216 such that rotation of the drum 213 is transferred to the electrical power generator 216 through the gearing mechanism 214 to generates electricity.

Figure 2C:
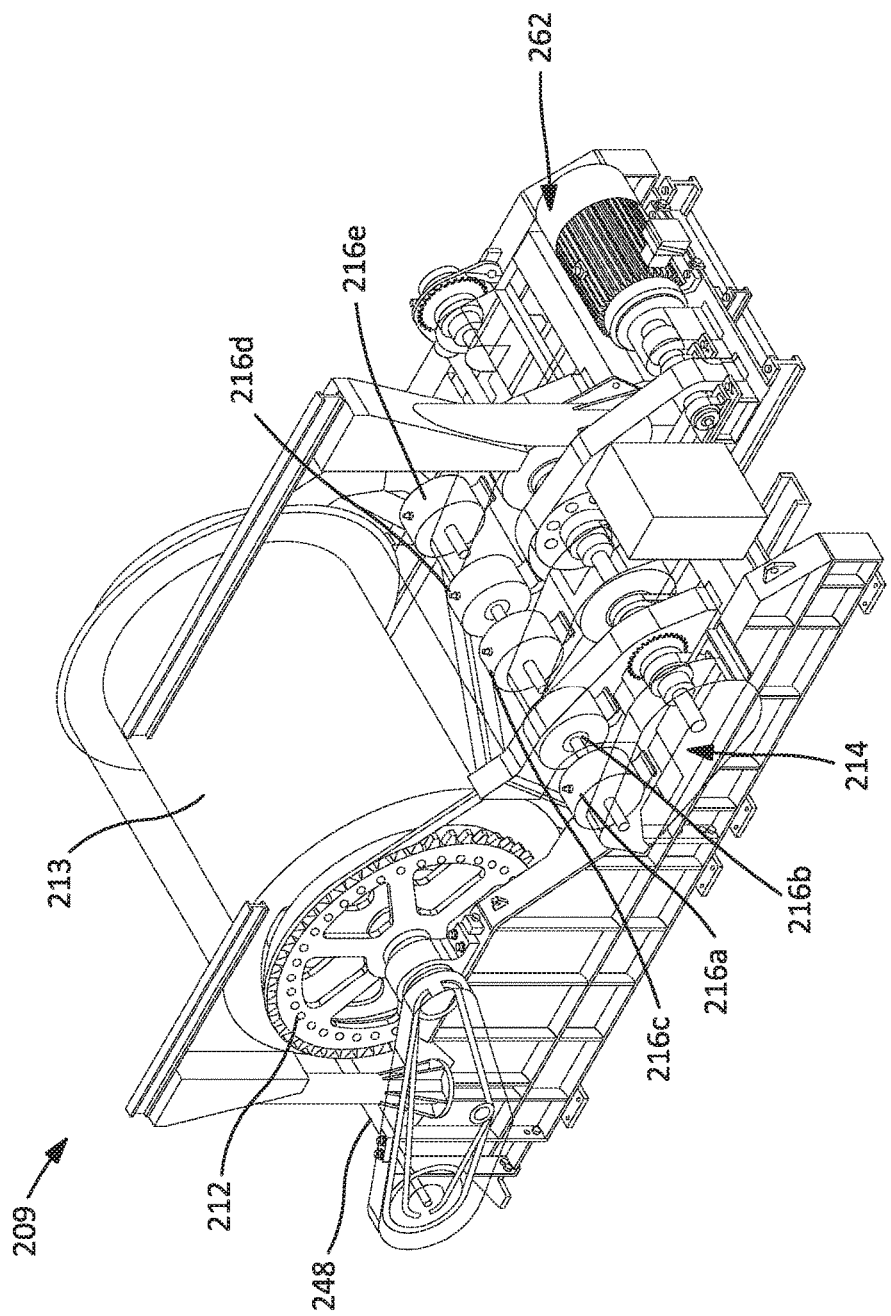

FIG. 2C illustrates yet another embodiment of a directional converter 209. Similar to the directional converters described above, directional converter 209 includes a drum 213 around which an anchor cable may be wrapped, a drive gear 212, a gearing mechanism 214, and generators 216*a*-216*e*. In an embodiment, the directional converter 209 may further include a level winder assembly 248 configured to maintain a uniform wrapping of the anchor cable 203 as it is wound around its respective drum 213 by directing each wrap of the anchor cable 203 around the drum 213 to sit tightly next to the previous wrap. The level winder assembly 248 may include a guide mechanism that guides the anchor cable as it is wound around the drum 213 so that it is wound evenly across the drum 213. In an embodiment, the guide mechanism may include a plate with a slot in which the anchor cable passes through. The guide mechanism may further include two or more oppositely-positioned vertical rollers to prevent lateral movement of the anchor cable. The guide mechanism may be coupled to one or more axles that are in turn coupled to the drive gear 212 (and, optionally, a gearing mechanism) such that one full rotation of the drum 213 causes the guide mechanism to travel a specified length of the drum 213 in a first direction along the rotational axis of the drum. The specified length that the guide mechanism travels may be a function of the diameter of the anchor cable 213. After the guide mechanism has traveled one full length of the drum 213, the guide mechanism may switch its direction of travel and move in a second direction that is opposite the first direction. After the guide mechanism travels the length of the drum in the second direction, this process may be repeated. The one or more axles may include grooves or threads arranged in a corkscrew around the axle. The level winder assembly 248 may travel in the first direction along a first groove and, after travelling one full length of the drum, the level winder assembly may travel along a second groove that crosses the first groove.

The directional converter 209 may utilize a gearing mechanism having at least one sprocket on an axle or a spindle, and a gear box. The gear box converts an input rotations per minute (RPM) into an output RPM that is different than (preferably greater than) the input RPM to increase the rotational energy transmitted to the generator. This may be accomplished by using a series of gears of differing radii coupled to one another or via a chain, for example. The gearing mechanism or alternatively, the gear box, may include a gear multiplication arrangement in order to increase the output RPM of the directional converter 209 and applied to the generator 216. The electric generator(s) 216 may require a faster rotational input than can be provided by a relatively simple gearing mechanism that does not include a gear multiplication arrangement. Thus, a slower RPM of the drum may be converted into a faster RPM by a gear multiplication arrangement to cause greater RPM transferred to the generator. The gear multiplication arrangement may include a series of gears of differing radii that are coupled to one another by a chain, for example, such that an input gear has a larger radius with a slower RPM while an output gear has a smaller radius and a faster RPM.

The electrical generator(s) 216 may include a fixed magnet (or permanent magnet) generator. A fixed magnet generator includes a permanent magnet fixed to a shaft and housed within a stationary armature. The armature includes one or more metal wires/coils within the magnetic field of the permanent magnet such that, upon rotation of the permanent magnet, an electric current is induced in the wires. A fixed magnet generator may be suitable for generating electricity using a lower rotational speed, such as a rotational speed of under 1000 RPM, for example.

In another embodiment, also shown in FIG. 2C, the directional converter may include a rewind assembly 262. The rewind assembly 262 may be directly coupled to the drum 213 so as to rotate the drum 213 and rewind the anchor cable and displacement vessel. The rewind assembly may be implemented using any known technique in the art, such as, a hydraulic motor. The rewind assembly may include a detachable coupling so that the rewind assembly is selectively coupled to the drum 213. In this case, the detachable coupling will be connected to the drum 213 during rewinding and can be detached while the displacement vessel is generating electricity.

Figure 3A:
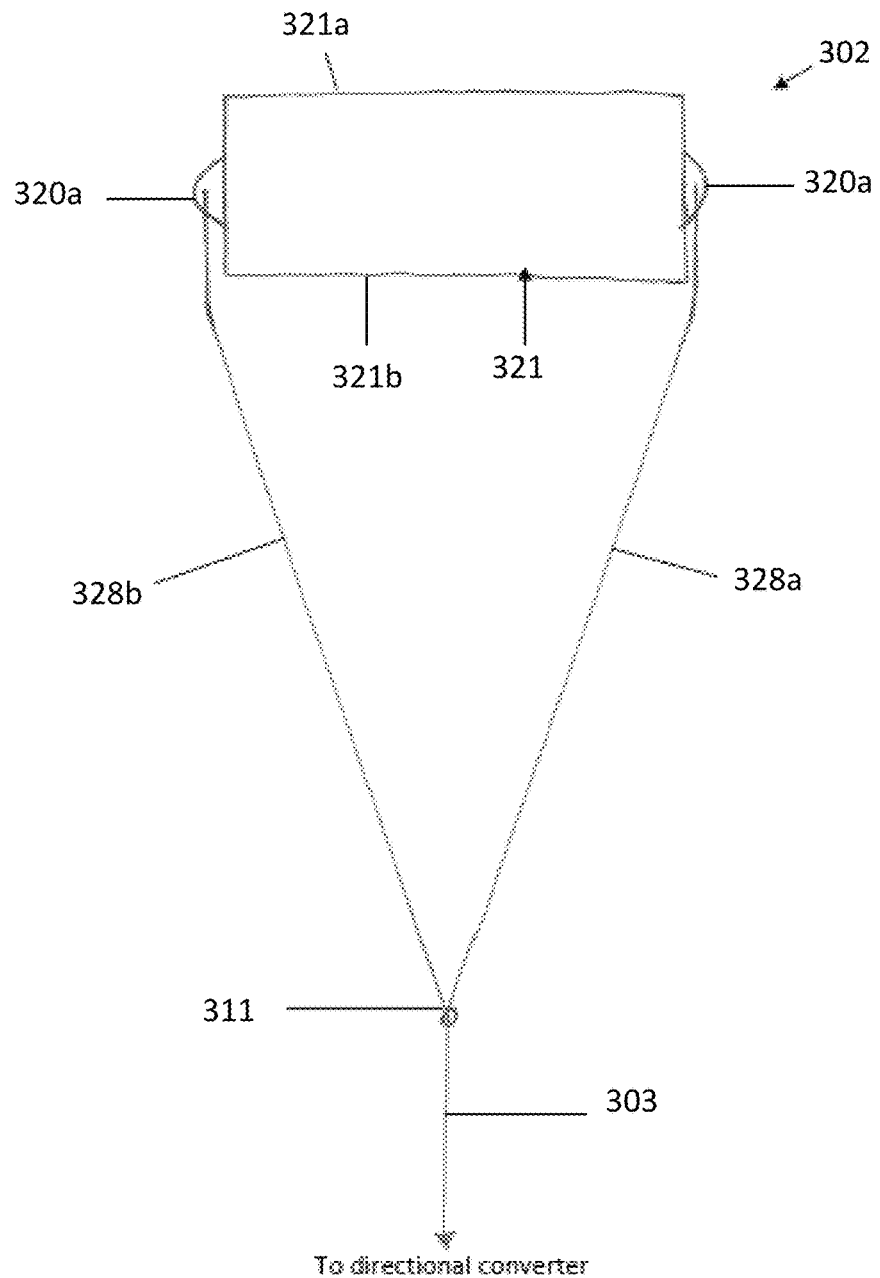
FIG. 3A shows an exemplary displacement vessel.

FIG. 3A shows a top view of a displacement vessel 302 that is rotatable in the water. The displacement vessel 300 may be adapted to float in the water by way of a floatation device as described above and below. The displacement vessel 300 includes a drag panel 302 having a first side 302a and a second side 302b that are adapted to capture drag forces from the flow of water due to tidal action and/or other water flows. The first side 302a and second side 302b are shown as substantially flat, but may be adapted to have any suitable shape to enhance (or reduce) the capture of drag forces as will be described in more detail below.

Because the speed and direction of water varies during a tidal cycle, the displacement vessel may be rotated to orient itself with respect to the flow of water in order to maximize the force of the water captured by the displacement vessel or otherwise control the amount of force captured by the drag panel depending on prevailing current conditions.

This rotation may be achieved using control cables attached to the sides of the displacement vessel—forming a "bridle"—such that the shortening or releasing of the length of the control cable(s) allow the displacement vessel to turn, rotate, or otherwise change the angle of the drag panel relative to water flow. The control cables may be attached at the ends or sides of the displacement vessel using any suitable number of connection points to connect the displacement vessel to the anchor cable. In an example described in more detail below, the displacement vessel includes four connection points corresponding to four separate control cables and the connection points may be generally located at corners of the displacement vessel. In another example described in more detail below, the displacement vessel may include redundant control cables (and, if desired, redundant control mechanisms) such that the displacement vessel may have eight control cables generally connected at the corners of the displacement vessel. The control cables may be attached to the displacement vessel by a control mechanism, such as a motor or winch, for example, configured to independently, or cooperatively control (i.e., adjust) the length of the control cables. The control mechanism may be mounted in or on the displacement vessel. Continuing the example from above, four control mechanisms may be mounted on the displacement vessel at each of the four connection points to independently control the four control cables. The control mechanism may lengthen or shorten the control cables, causing rotation of the vessel and thereby decrease or increase the distance between the end of the displacement vessel attached to the control cable and the anchor cable. The displacement vessel may include redundant cables connected to redundant control mechanisms to ensure operability in the event that a cable breaks or a control mechanism malfunctions.

The bridle—or series of control cables—may include any suitable number of control cables and each control cable may be connected to the displacement vessel at a connection point. Exemplary connection points along the displacement vessel may include the ends, corners, or sides of the displacement vessel. As stated above, control mechanisms may be attached to the displacement vessel at the connection points and each control mechanism may connect the displacement vessel to an individual control cable. Because each control mechanism may independently shorten or lengthen (wind or unwind) its respective control cable, the bridle may control the orientation of the displacement vessel in the water. In particular, the bridle may be used to change the angle of attack of the displacement vessel with respect to the water/current flow, e.g., the yaw, pitch, and/or roll. For example, the pitch of the displacement vessel may be changed to point the displacement vessel in a downwards direction to cause the displacement vessel to submerge or dive deeper into the water if already submerged. As an example of a method of pointing the displacement vessel downwards, one or more control mechanisms generally located at the top of the displacement vessel may wind control cables in. Additionally, or optionally, one or more control mechanisms located generally at the bottom of the displacement vessel may unwind control cables to effect a change in the pitch of the displacement vessel. A similar process may be used to rotate the displacement vessel upwards to cause the displacement vessel to surface or decrease its depth in the water.

To illustrate the general case of controlling the angle, the displacement vessel 300 further includes control cables 308a and 308b extending from the drag panel 302 adapted to controllably adjust the orientation of the drag panel 302 in the water. The control cables 308a and 1008b may be coupled to an anchor cable 303 at one end via a coupling mechanism 309 and the anchor cable 303 may be further connected to a directional converter and a generator at a stationary location, as described above. Each control cable 308a and 308b may also be coupled at another end to a/an adjustment/control mechanism (indicated generally as 320a and 320b) mounted on or within the displacement vessel 302, such as a motor and drum assembly or a winch, for example. Each control mechanism 320a and 320b may independently wind up and/or release its respective control cable to effect rotation of the displacement vessel in the water. For example, a first control mechanism 320a may wind up (or shorten) control cable 308a while a second control mechanism 320b releases (or lengthens) control cable 308b, thus rotating the displacement vessel 302 in a clockwise direction and controllably adjusting the amount of drag force exerted on the drag panel 302. The first control mechanism 320a and second control mechanism 320b may also rotate the displacement vessel 302 in the opposite (counterclockwise) direction by the reverse operation, i.e., the first control mechanism 320a may release control cable 308a and the second control mechanism 320b may wind up control cable 308b. Those skilled in the art will hereby also recognize that a single motor/drum or winch can be used with the cables mounted in opposite directions and that as the drum/winch turns, one cable is unwound and the other cable is wound. In an embodiment, the control mechanism (s) may include a traction winch. By providing a displacement vessel 302 that is capable of rotating in the water to controllably adjust the drag force exerted on the drag panel 302, the amount of electricity generated by the generator may also be controllably adjusted.

The drag panel may be coupled to the displacement vessel such that the drag panel may swivel about an axis of the displacement vessel. In this instance, the control cables may be coupled to the drag panel to rotate the drag panel without rotating the entire displacement vessel. Alternatively, a control mechanism such as a motor may be coupled to the axle on which the drag panel is fixed to control the rotation of the drag panel. The displacement vessel may include multiple drag panels extending into the water from the bottom surface of the displacement vessel. In this instance, each drag panel may be fixed to an axle such that the drag panel may rotate. A control mechanism may be coupled to each axle to control the rotation of each individual drag panel.

Figure 3B:
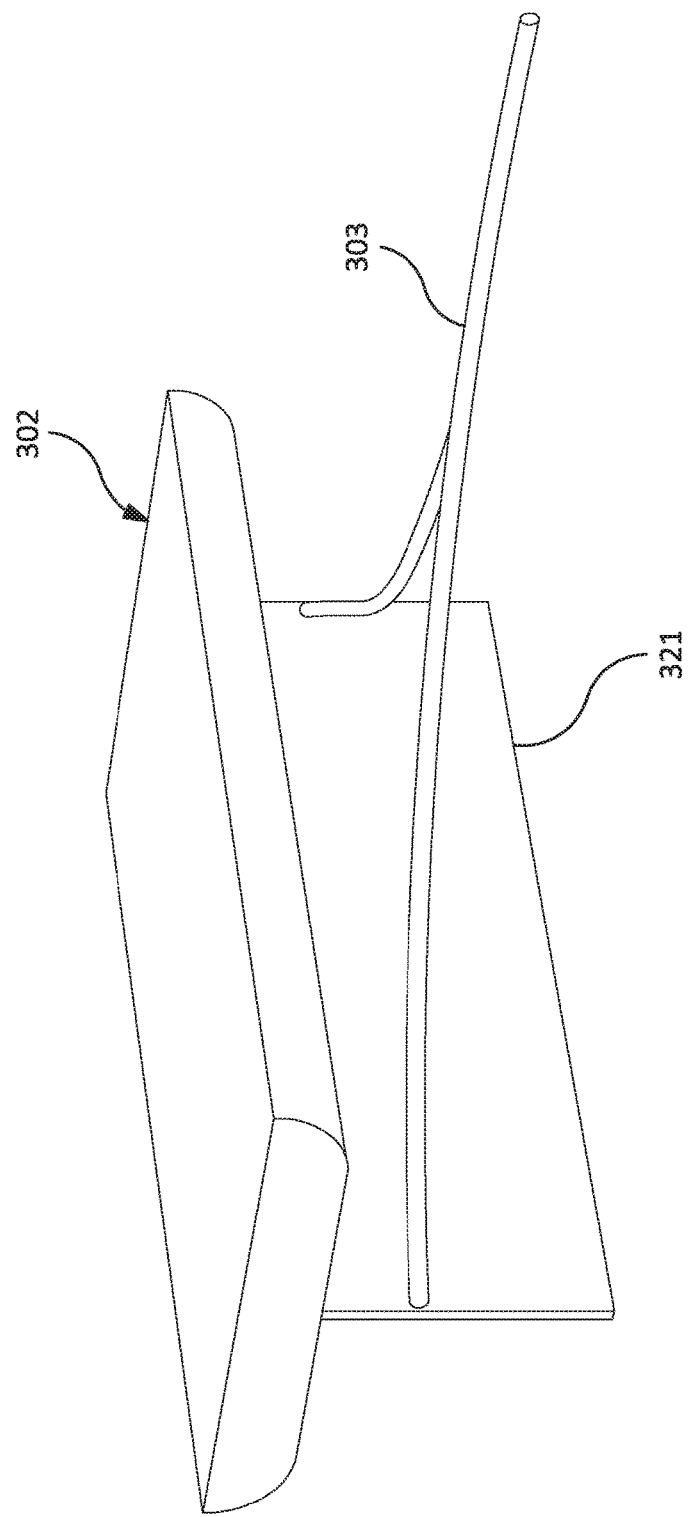
FIG. 3B shows an isometric view of an exemplary displacement vessel.

FIG. 3B shows a displacement vessel 302 having a skin. Displacement vessel 302 may include a structure or frame that is covered with a waterproof skin. The skin may be made of a metal, composite, polymer, or any other suitable material that can withstand the ocean environment and drag forces from the ebb and flow of water due to tidal action. Displacement vessel 302 further includes a drag panel 312 as described above with respect to FIGS. 1A-1C. Generally, an anchor cable 303 is connected to the drag panel 312 at both sides of the drag panel 312. The location along the drag panel 312 where the anchor cable 303 is connected may correspond to a center of mass of the displacement vessel 302, such that when a current causes the displacement vessel 302 to drift, the displacement vessel 302 will remain relatively stable in the water while maintaining a force on the anchor cable 303. The other end of the anchor cable 303 may be coupled to at least one directional converter and at least one generator as described above. The directional converter and the generator may be located on land or on a platform in the ocean.

FIG. 4A shows a displacement vessel 402 having a vertically rotatable drag panel 421. In particular, the rotatable drag panel 421 may be coupled to and freely rotatable about a vertical axis of the displacement vessel 402 via an axle 415. The axle 415 may be coupled to a control mechanism 420, such as a motor, for example, that may be configured to control the angle of rotation of the drag panel 421.

Figure 4B:
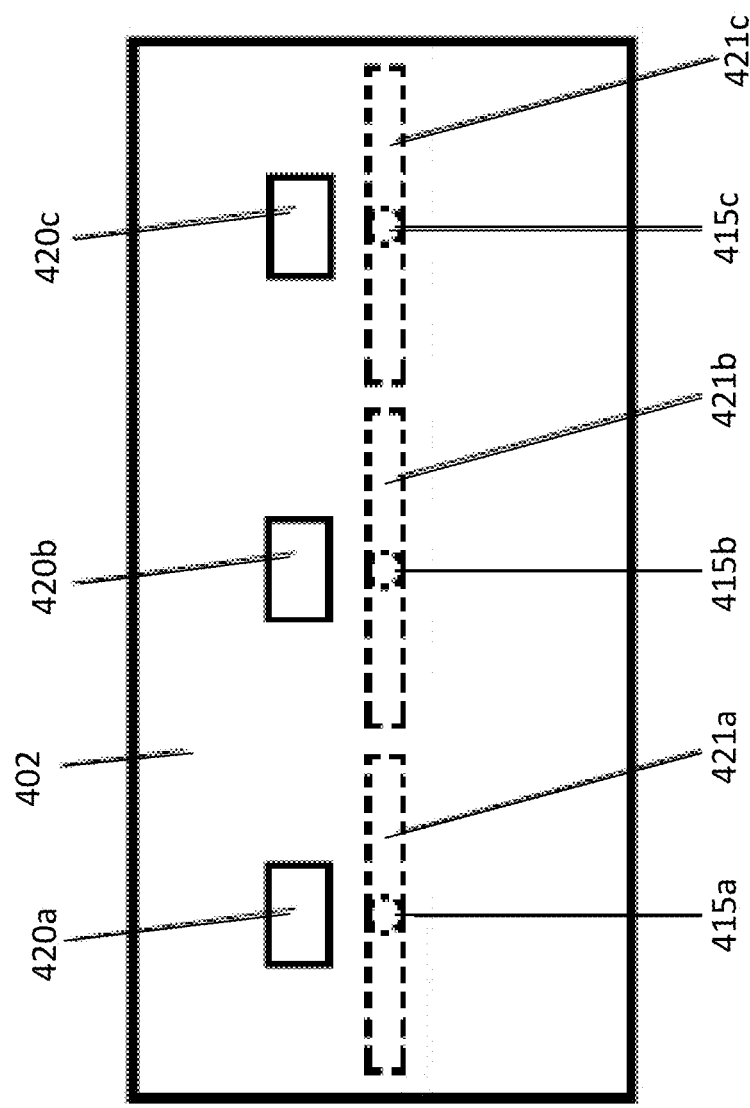
FIG. 4B shows an exemplary displacement vessel having multiple vertically rotatable drag panels.

FIG. 4B shows a displacement vessel 402 having multiple vertically rotatable drag panels 421a-421c. In particular, the rotatable drag panels 421a-421c may be coupled to and freely rotatable about respective vertical axes of the displacement vessel 402 via axles 415a 415c. Each axle 415a-415c may be coupled to a respective control mechanism 420a-420c, such as a motor, for example, that may be configured to control the angle of rotation of its respective drag panel 421a-421c. These configurations will function to control, or assist in controlling, the orientation of the displacement vessel, whether in conjunction with one or more control cables or independently of control cables.

Figure 5A:
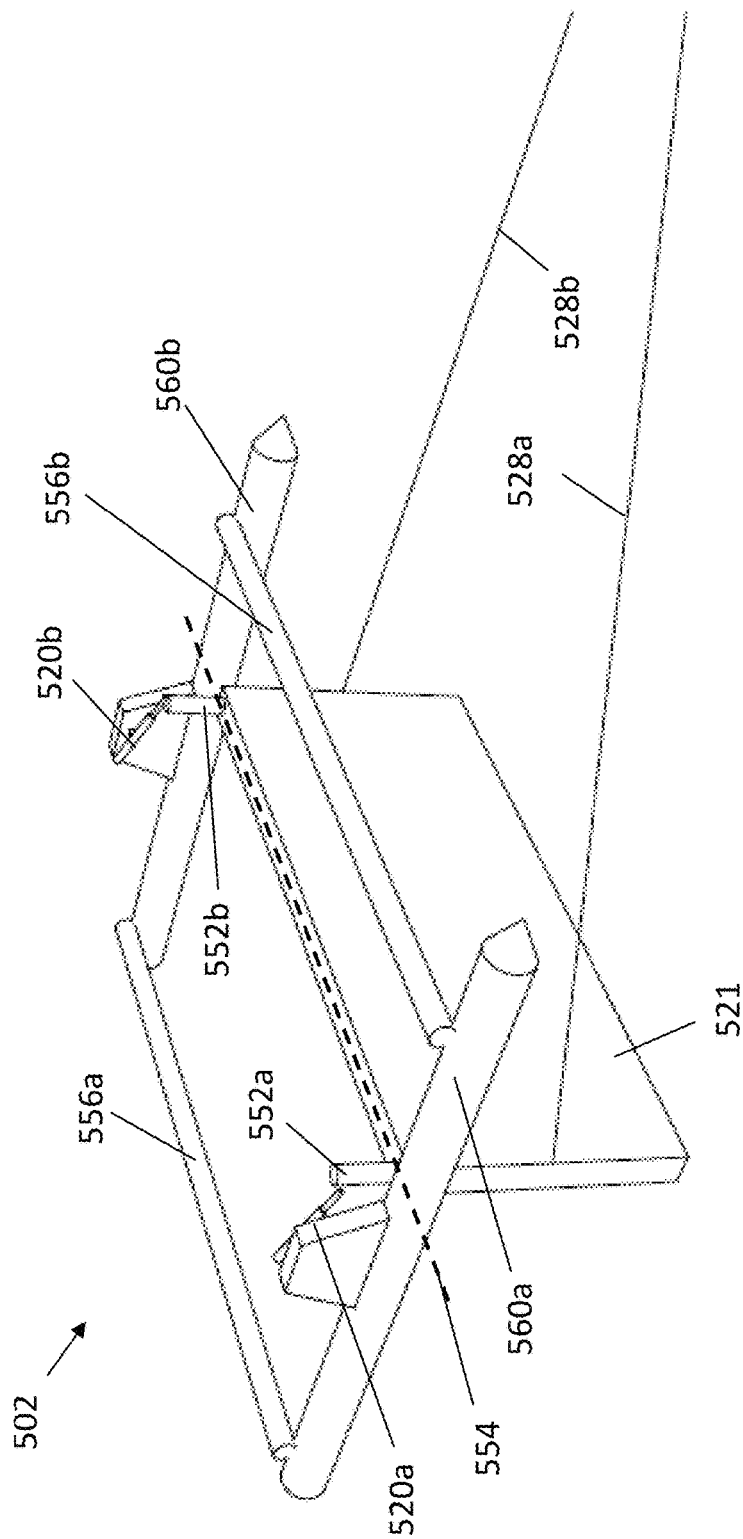
Figure 5C:
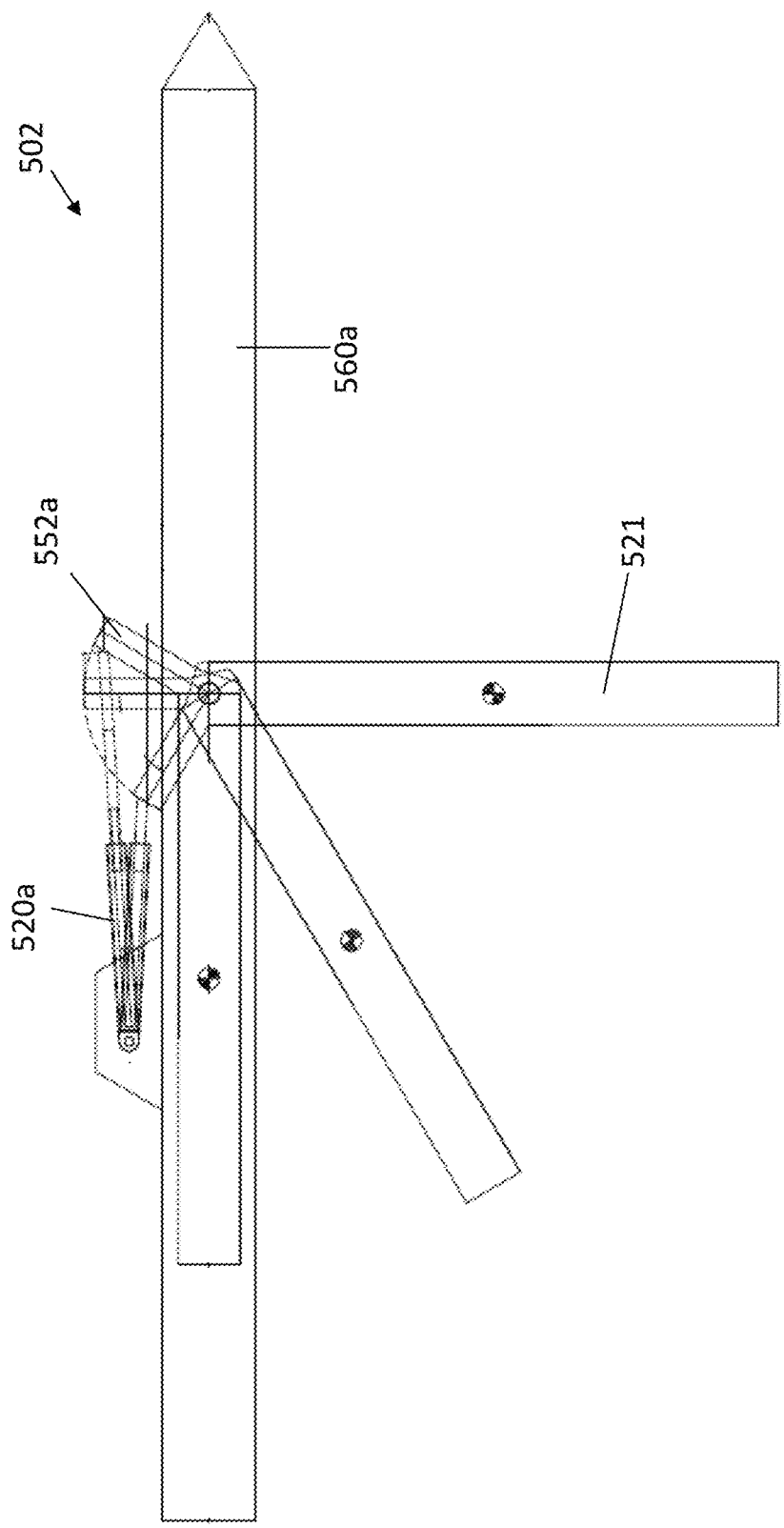

FIGS. 5A-5C show an exemplary displacement vessel 502 having a horizontally rotatable drag panel 521. The displacement vessel 502 includes floatation devices 560a and 560b connected by transverse members 556a and 556b to create a frame from which to hold the drag panel 521 as the displacement vessel floats in the water. The floatation devices 560a, 560b and transverse members 556a, 556b may be made from metal (e.g., steel, stainless steel, titanium), polymer (e.g., polyethylene terephthalate, polypropylene, polycarbonate, HDPE), composite, or any other suitable material or combination of materials as is known in the art. While only two floatation devices 560a, 560b are shown, one skilled in the art will understand that any number of floatation devices may be used to maintain buoyancy of the displacement vessel 502 and to hold the weight of the drag panel 521 in the water. In an embodiment, the floatation devices 560a and 560b are pontoons. In another embodiment, the floatation devices 560a and 560b may have a tubular or cylindrical shape.

The drag panel 521 extends from the displacement vessel 502 in a generally downwards direction (into the water) in order to capture drag forces caused by the flow of water due to tidal action or other currents. As the water current flows over the surface of the drag panel 521, the drag panel 521 acts as a "sail" to harness the force exerted by the flow of the water to move the displacement vessel 502 through the water. The drag panel 521 is rotatably coupled to the floatation devices 560a and 560b along the horizontal axis 554 such that it may freely rotate about the horizontal axis 554 from an active configuration (drag panel in the water) to a retracted configuration (drag panel out of the water). The horizontally rotatable drag panel 521 may be rotated about the horizontal axis by an angle with respect to a horizontal axis. The angle may be varied between 0 degrees and 180 degrees. In an example, when the drag panel is at 90 degrees with respect to the horizontal axis, the drag panel is vertically extending into the water. The angle may be decreased (e.g., by retracting the drag panel) to adjust the amount of drag force experienced by the drag panel 521. In another example, when the direction of water flow changes in the tidal cycle, the angle may be increased to adjust the amount of drag force experienced by the drag panel 521. In this arrangement, the drag panel 521 can be rotated to a desired angle without having to change the orientation of the entire displacement vessel 502.

The drag panel 521 may be made of metal (e.g., steel, stainless steel, titanium, aluminum), polymer (e.g., polyethylene terephthalate, polypropylene, polycarbonate, polyethylene, high-density polyethylene), composite, or any other suitable material or combination of materials as is known in the art. The drag panel may have a height that is between 1 foot and 100 feet, a width between 1 foot and 200 feet, and a thickness that is between 0.1 inch and 24 inches. One skilled in the art will recognize that the displacement vessel and drag panel may have any suitable dimensions to capture drag forces from the ebb and flow of the tide or other water currents. To minimize weight, the drag panel 521 may be constructed of a lightweight frame that is covered with a skin, such as sheet metal, polymer, or composite, for example. The drag panel 521 may be formed as two or more individual panels to allow potential for more variation in surface area facing the current or tide. The drag panel 521 may further comprise any suitable shape on the surfaces facing the current to harness drag forces. For example, the drag panel 521 may include a concave shape on one or more surfaces. In another example, the drag panel may include a lofted cut shape.

The displacement vessel 502 further includes control mechanisms 520a and 520b attached to floatation devices 560a and 560b configured to rotate the drag panel 521. The control mechanisms 520a and 520b may operate independently or together to rotate the drag panel 521 about a horizontal axis 554 of the displacement vessel 502. Any suitable number of control mechanisms may be used to rotate the drag panel 521. The control mechanisms 520a and 520b may include, for example, a winch, a motor, hydraulics, pneumatics, or any other suitable control mechanism as is known in the art. The control mechanisms 520a and 520b may be attached to the drag panel 521 at any suitable point. In some embodiments, the drag panel 521 may include arms 552a and 552b extending from the drag panel 521. The arms 552a and 552b may extend at any suitable angle from a surface of the drag panel and, preferably, extend from the top surface of the drag panel. The arms 552a and 552b provide a lever on which the control mechanisms 520a and 520b provide force to rotate the drag panel 521 around the points of attachment to the displacement vessel 502.

In an embodiment, material may be added to the drag panel 521 to provide a counterweight that assists the control mechanisms 520a, 520b in rotating the drag panel 521. The counterweight may be added to the front side or the back side of the drag panel, depending on which way the drag panel is intended to rotate. In the embodiment where the drag panel rotates back as shown in FIGS. 5A-5C and 6A-6C below, a counterweight may be added on the front side of the drag panel above the axis of rotation (i.e., the horizontal axis 554).

As with the displacement vessels described above, displacement vessel 502 may include a bridle having control cables 528a and 528b configured to steer the displacement vessel 502 through the water. The displacement vessel 502 may include any suitable number of control cables, such as two cables or four cables, for example. The control cables 528a and 528b extend to an anchor cable 503 which connects the displacement vessel to a directional converter at a stationary location, such as land.

Figure 5D:
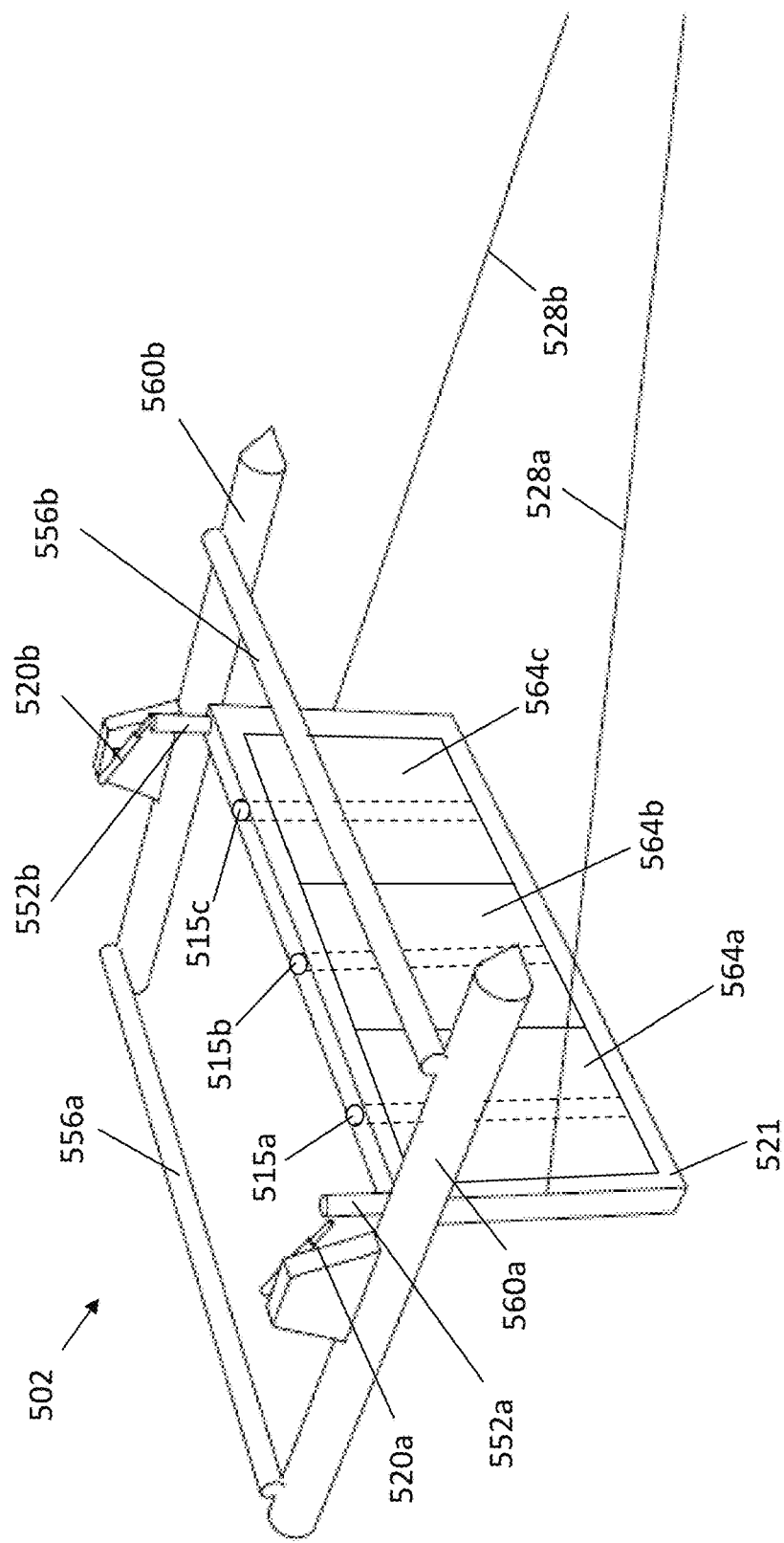
FIG. 5D shows an exemplary displacement vessel having a horizontally rotatable drag panel and vertically rotatable sub-panels.

As shown in FIG. 5D, the drag panel 521 may include a frame having one or more vertically rotatable sub-panels 564a-564c. The vertically rotatable sub-panels 564a-564c are similar to the drag panels 421 shown in FIGS. 4A and 4B and may be used to reduce the force necessary to retract the entire drag panel 521 about the horizontal axis. Each vertically rotatable subpanel 564a-564c is rotatable around a respective axle 515a-515c. Control mechanisms may be used, similar to the control mechanisms shown in FIGS. 4A and 4B, to control the rotation of each respective sub-panel 564a-564c. In an example, before retracting the drag panel 521, the vertically rotatable sub-panels may be rotated (preferably by 90 degrees) and then the entire drag panel 521 may be retracted out of the water. Alternatively, the vertically rotatable sub-panels may be used for steering purposes or to adjust the amount of drag force experienced by drag panel 521 (and thus, electricity generated by the directional converter at the stationary location).

Figure 6A:
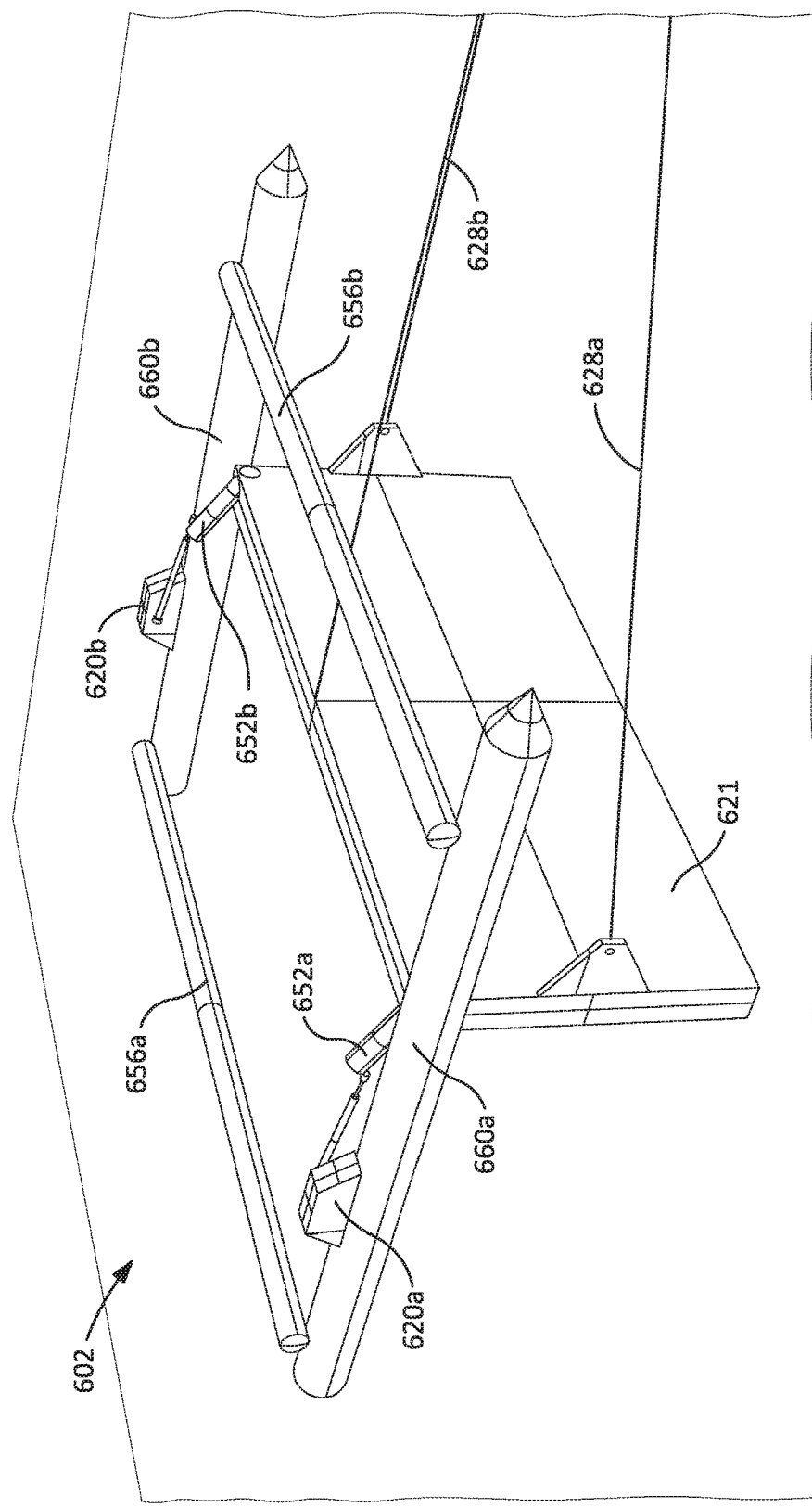
FIGS. 6A-6C shows an exemplary displacement vessel having a horizontally rotatable drag panel in various positions.
Figure 6B:
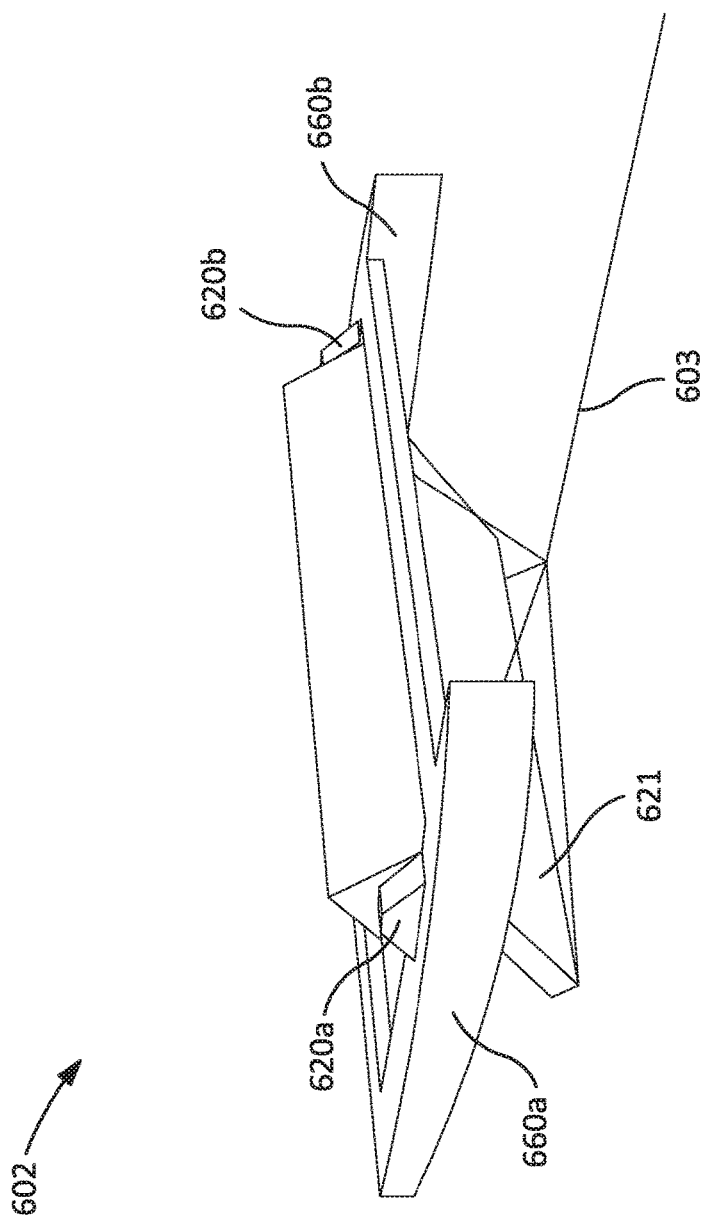
Figure 6C:
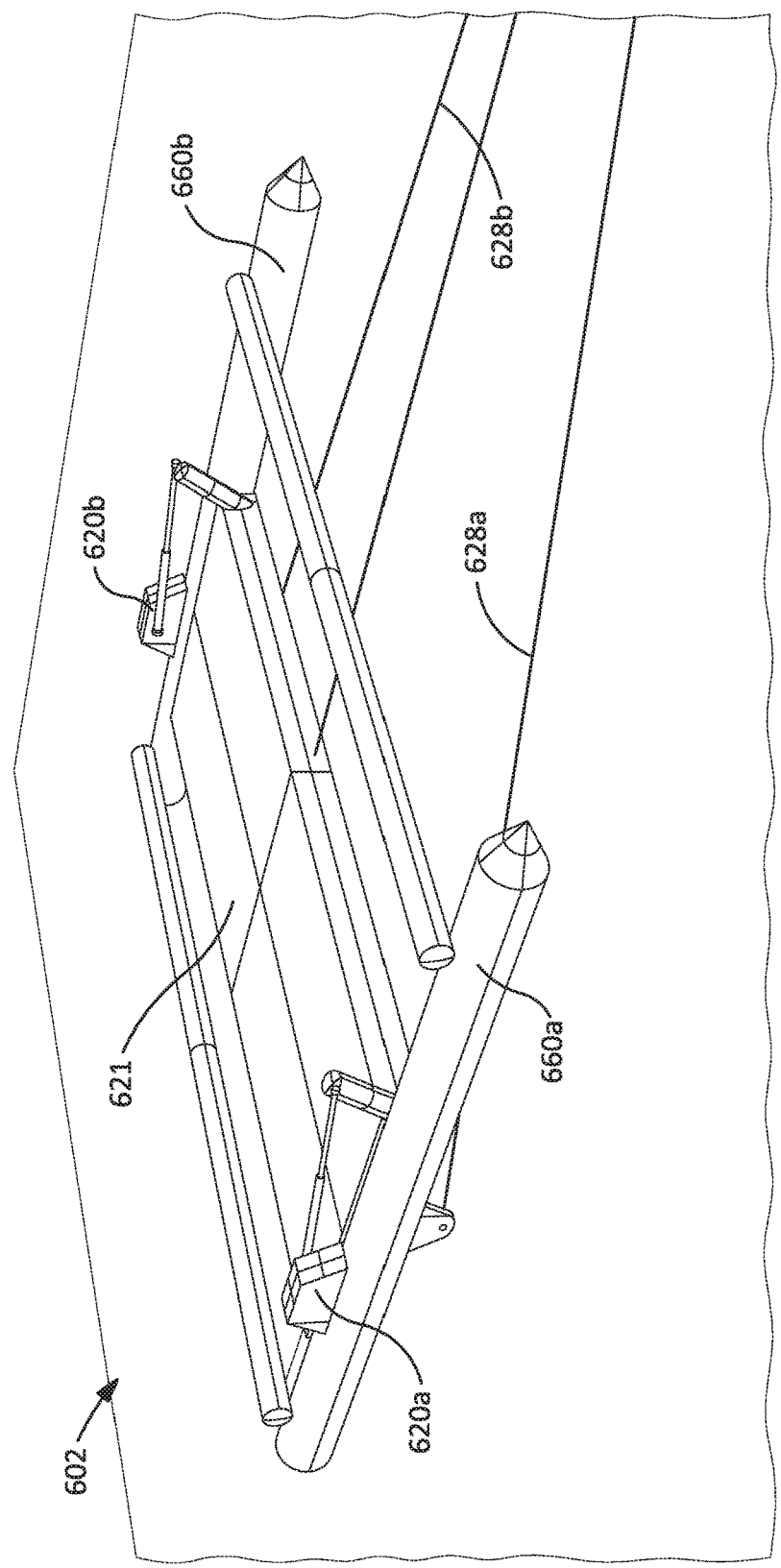

FIGS. 6A-6C shows an exemplary displacement vessel 602 having a horizontally rotatable drag panel 621 in various positions. Similar to the displacement vessels shown in FIGS. 5A-5C, the displacement vessel 602 includes floatation devices 660a and 660b connected via transverse members 656a and 656b. A drag panel 621 is attached to the two floatation devices 660a and 660b and is also coupled to control mechanisms 620a and 620b via arms 652a and 652b that extend from the drag panel 621. In FIGS. 6A and 6C, the arms 652a and 652b extend at an angle from the drag panel 621. In an embodiment, the arms 652a, 652b may extend from the drag panel 621 at any suitable angle, such as between 0° and 45° from the vertical, for example. Two control cables 628a and 628b are attached to the drag panel 621 and serve to couple the displacement vessel 602 to an anchor cable (not shown) and a directional converter located at a stationary location, such as land. One skilled in the art will recognize that any suitable number of control cables (e.g., two, four, or eight) may be used to control the orientation of the displacement vessel 602.

In FIG. 6A, the drag panel 621 is fully vertical so that the displacement vessel 602 will capture drag forces cause by the flow of water due to currents and/or tidal action. In this position, the drag panel 621 may capture a maximum amount of drag force from the flow of water than if the drag panel 621 were retracted at all. In FIG. 6B, the drag panel 621 is partially retracted by control mechanisms 620a and 620b. In FIG. 6C, the drag panel 621 is fully retracted by the control mechanisms 620a and 620b such that the drag panel 621 is horizontal and substantially out of the water.

Figure 7A:
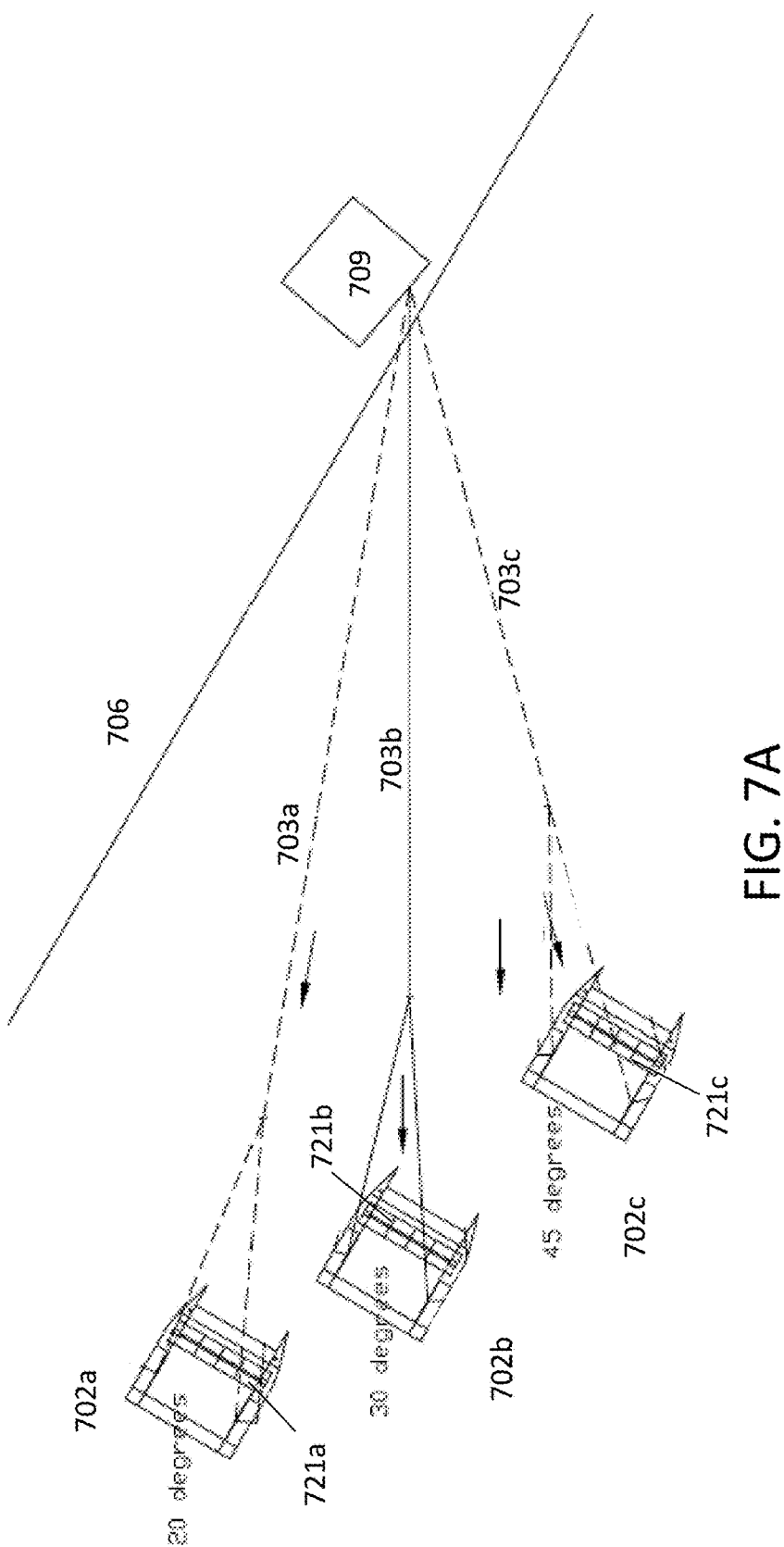
FIG. 7A shows an exemplary retrieval mode with the drag panel retracted.

FIG. 7A shows an exemplary retrieval mode with the drag panel 721 retracted. Displacement vessels 702a-702c represent different scenarios of retrieval for various angles between the anchor cable and the stationary location when the displacement vessel 702a-702c has a fully retracted drag panel. Displacement vessel 702a has an angle of 20° between the stationary location 706 and the anchor cable 703a, which is coupled to the directional converter 709 at the stationary location 706, i.e., land. Displacement vessel 702b has an angle of 30° between the stationary location 706 and the anchor cable 703b, which is coupled to the directional converter 709 at the stationary location 706, i.e., land. Displacement vessel 702c has an angle of 45° between the stationary location 706 and the anchor cable 703c, which is coupled to the directional converter 709 at the stationary location 706, i.e., land.

Figure 7B:
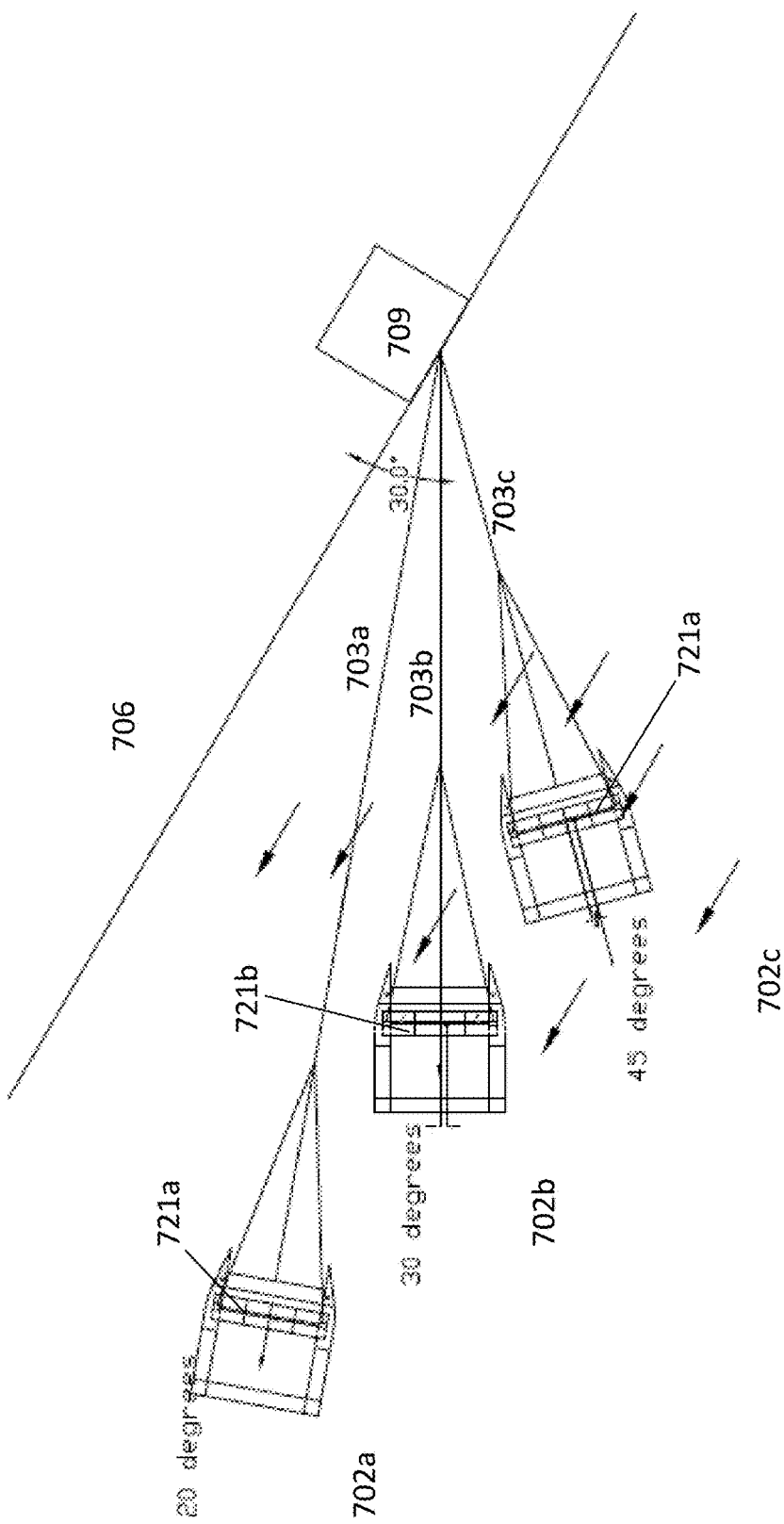
FIG. 7B shows an exemplary retrieval mode with the drag panel fully deployed.

FIG. 7B shows an exemplary retrieval mode with the drag panel 721 fully deployed. Similar to the displacement vessels 702a-702c shown in FIG. 7A, displacement vessels 702a-702c represent different scenarios of retrieval for various angles between the anchor cable and the stationary location when the displacement vessel 702a-702c has a fully deployed drag panel. Displacement vessel 702a has an angle of 20° between the stationary location 706 and the anchor cable 703a, which is coupled to the directional converter 709 at the stationary location 706, i.e., land. Displacement vessel 702b has an angle of 30° between the stationary location 706 and the anchor cable 703b, which is coupled to the directional converter 709 at the stationary location 706, i.e., land. Displacement vessel 702c has an angle of 45° between the stationary location 706 and the anchor cable 703c, which is coupled to the directional converter 709 at the stationary location 706, i.e., land.

Figure 8:
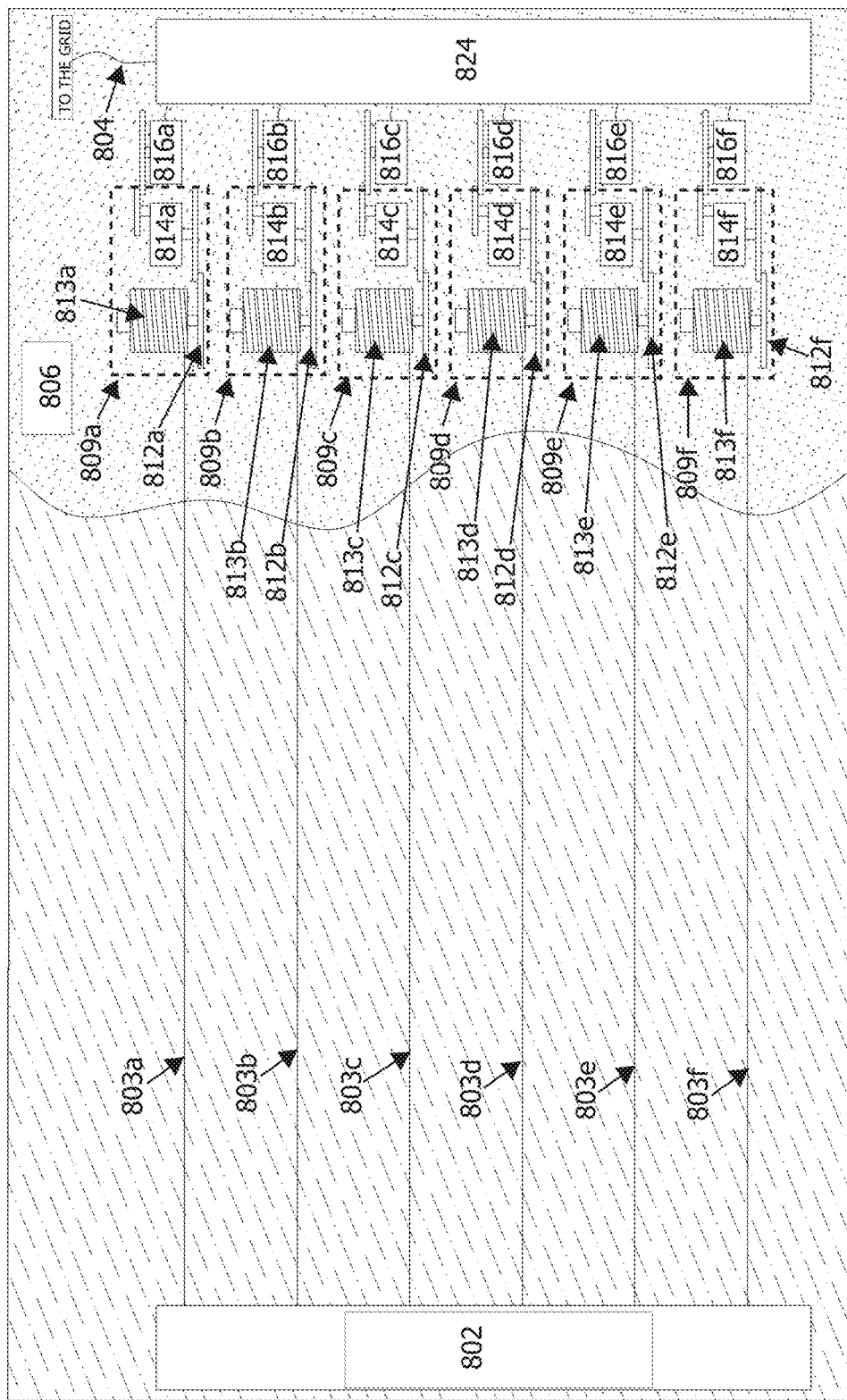
FIG. 8 shows an exemplary displacement vessel having an array of directional converters and generators on land.

FIG. 8 shows an exemplary displacement vessel 802 having an array of directional converters 809a-809f and generators 816a-816f at a stationary location 806. The displacement vessel 802 may be similar to any of the displacement vessels having a rotatable drag panel as described in more detail above. In this instance, one displacement vessel 802 is coupled to a plurality of anchor cables 803a-803f and each anchor cable is coupled to a respective directional converter 809a-809f that is fixed at a stationary location 806. As an example, the stationary location 806 may be land, a barge, a pier, a platform in the ocean anchored to the ocean floor, or the ocean floor. In FIG. 8, the stationary location is the shore (land) adjacent the body of water in which the displacement vessel is located. Moreover, after consideration of the present disclosure, one of skill in the art will recognize that the stationary location may any suitable plot of land or on a mobile location, such as an area further inland or on a crane to provide, among other advantages, protection against flooding and waves caused by storms. The directional converters described herein can thus be positioned at any suitable stationary location such that one or more anchor cables can couple the directional converter(s) to one or more displacement vessels in the water.

Each of directional converters 809a-809f may be substantially similar to the directional converters described above. For example, each directional converter 809a-809f may include a drum 813a-813f around which the respective anchor cable 803a-803f is wrapped. Further, each directional converters 809a-809f may be independently engaged (or disengaged) with respect to the movement of the displacement vessel 802 to generate electricity. As the ebb and flow of tidal action causes the displacement vessel 802 to drift away from the stationary location 806, each anchor cable will exert a force on the respective drums 813a-813f, causing the drums 813a-813f to rotate. The drums 813a-813f are fixed on axles 815a-815f including drive gears 812a-812f, and the drive gears 812a-812f are coupled to gear boxes 814a-814f, which may be substantially similar to the gear box as described above. As the drums 813a-813f rotate and are engaged, the drive gears 812a-812f may rotate and transfer mechanical power to the gear boxes 814a-814f. The engaged gear boxes 814a-814f may convert input RPM from the drive gears 812a-812f to a different RPM output to be transmitted to generators 816a-816f. The engaged gear boxes 814a-814f are coupled to the generators 816a-816f, which may be, for example, fixed magnet generators as described above. The engaged gear boxes 814a-814f transmit the mechanical power to the generators 816a-816f to produce electrical power that may be stored in a storage facility 824, which may include one or more batteries. The electrical power may be transmitted via a wire 804 to an electrical grid such that it may be distributed to a consumer to be consumed. When one directional converter is disengaged the respective drum may still rotate upon the movement of the displacement vessel and anchor cable, but the drive gears, gear boxes or generators may be positioned and disengaged such that no electricity is produced by that respective generator.

As the ebb and flow of tidal action causes the displacement vessel 802 to drift back towards the stationary location 806, a control mechanism may reel in the excess slack on the anchor cables 803a-803f. The control mechanism may be substantially similar to the control mechanism described above. For example, the control mechanism may be a spring or motor that is coupled to the drums 813a-813f.

Generally, each of the generators 816a-816f may have similar or different electrical output ratings. For example, each of generators 816a-816f may have an electrical output rating of 15 kW at 125 RPM. In another embodiment, the electrical output rating of the generator may be between 1 MW to 10 MW at a speed between 5 RPM and 1600 RPM. Alternatively, each of generators may have different electrical output ratings. For example, the generators 816a-816f may have different electrical output ratings at 1 kW, 5 kW, 10 kW, 15 kW, 20 kW, and 25 kW. In another example, the generators 816a-816f may have similar electrical output ratings of 15 kW.

As a generator array, one or more generator(s) (or directional converters) may be engaged while other generators (or directional converters) may be disengaged. In lower current speeds, a smaller number of generators 816a-816f may be engaged to generate electrical power while in faster current speeds, more generators 816a-816f may be engaged to produce electrical power. Such an array permits one displacement vessel to generate an amount of electricity that is directly proportional to the tidal forces acting upon the displacement vessel, and not limited to the generating potential of a single generator. While FIG. 8 shows six generators coupled to displacement vessel 802, this invention is not limited to this number of generators, and any suitable number of generators may be coupled to the displacement vessel, depending on the size of the displacement vessel, the expected strength of the tides and the available area of the stationary location.

Figure 9:
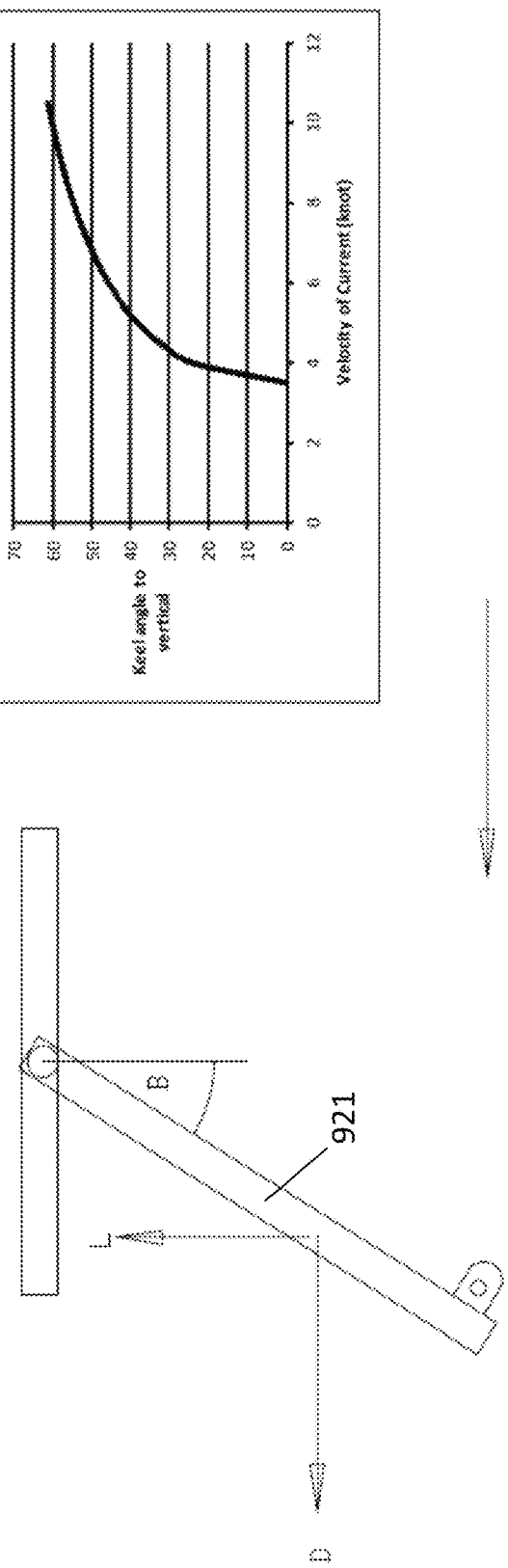
FIG. 9 shows a graph of velocity of water current and drag panel angle to maintain a specified drag force.

FIG. 9 shows a graph of velocity of water current speed and drag panel angle to maintain a specified drag force. Throughout the tidal cycle, current velocity may change. These changes in current velocity may change the amount of electrical power generated by the displacement vessel as higher currents tend to generate more electrical power than slow currents. The drag panel 921 may be controllably retracted, i.e., rotated about the horizontal, to maintain a specified amount of drag on the drag panel to thus generate a steady amount of electrical power regardless of the water current speed. As shown in the graph, to maintain 480,000 lbs. of force D on the drag panel through current speeds of about 3.5 knots to about 11 knots, the angle B between the drag panel 921 and the vertical axis must be increased.

The present disclosure also provides for a method of generating electricity using the flow of water due to tidal action. The method includes releasing a displacement vessel having a drag panel rotatable about a horizontal axis of the displacement vessel, wherein the drag panel extends at an angle from a surface of the water. In an embodiment, the drag panel may extend vertically into the water. The method further includes generating electricity as the displacement vessel travels due to the flow of water. The method may further include rotating the drag panel such that the drag panel is substantially horizontal after generating electricity. The method may further include rewinding the displacement vessel after rotating said drag panel.

The present disclosure also provides for a method of adjusting the amount of drag force experienced by a drag panel of a displacement vessel. The method includes releasing the displacement vessel in a body of water and rotating the drag panel by an angle about a horizontal axis of the displacement vessel to thereby adjust the amount of drag force experienced by the drag panel. In an embodiment, the angle is greater than 0 degrees and less than or equal to 90 degrees. In another embodiment, the angle of the drag panel may be varied between 0 degrees and 180 degrees with respect to the horizontal axis. In an embodiment, decreasing the angle between the drag panel and the horizontal axis decreases the amount of drag force experienced by the drag panel. In an embodiment, increasing the angle between the drag panel and the horizontal axis increases the amount of drag force experienced by the drag panel.

Variations and modifications will occur to those of skill in the art after reviewing this disclosure. The disclosed features may be implemented, in any combination and subcombination (including multiple dependent combinations and subcombinations), with one or more other features described herein. The various features described or illustrated above, including any components thereof, may be combined or integrated in other systems. Moreover, certain features may be omitted or not implemented. Additionally, in any of the embodiments described above, the displacement vessel, directional converter(s), and generator(s) may rely on both lateral and vertical displacement due to both the rise/fall and ebb/flow of tidal action.

Examples of changes, substitutions, and alterations are ascertainable by one skilled in the art and could be made without departing from the scope of the invention disclosed herein. All references cited herein are incorporated by reference in their entirety and made part of this application.

What is claimed is:

1. A tidal energy conversion assembly comprising:
a displacement vessel for lateral travel in the direction of tidal flow;
a drag panel mounted to the displacement vessel for capturing drag forces caused by tidal action occurring in a generally lateral direction, wherein the drag panel is pivotable about a horizontal axis from an active configuration for maximizing the capture of drag forces acting on the drag panel, to a retracted configuration for minimizing the capture of drag forces acting on the drag panel;
a control mechanism operatively coupled to the drag panel to pivot the drag panel;
a directional converter coupled to a generator, wherein said directional converter and said generator are positioned at a stationary location; and
an anchor cable having a first end, a second end, and a length in between the first end and the second end, wherein the first end of the anchor cable is connected to the directional converter and the second end of the anchor cable is connected to the displacement vessel;
wherein, as a result of its connection to said anchor cable, said directional converter activates said generator to generate electricity when the displacement vessel travels laterally relative to said stationary location as a result of drag forces captured by said drag panel from the tidal flow.

2. The tidal energy conversion assembly of claim 1, wherein the displacement vessel comprises at least one buoyant device.

3. The tidal energy conversion assembly of claim 2, wherein the at least one buoyant device comprises a pontoon.

4. The tidal energy conversion assembly of claim 2, wherein the assembly comprises at least two buoyant devices which are connected to one another via transverse structures.

5. The tidal energy conversion assembly of claim 1, wherein the control mechanism is selected from the group consisting of: a hydraulic mechanism, a winch, and a motor.

6. The tidal energy conversion assembly of claim 1, wherein the control mechanism is configured to pivot the drag panel by varying an angle of the drag panel between 0 degrees and 90 degrees with respect to the horizontal axis.

7. The tidal energy conversion assembly of claim 1, wherein the drag panel further comprises an arm connected to the control mechanism.

8. The tidal energy conversion assembly of claim 7, wherein the arm extends at an angle away from a vertical axis of the drag panel.

9. The tidal energy conversion assembly of claim 1, wherein the control mechanism is configured to pivot the drag panel at an angle which is from 0 degrees to at least 45 degrees from the vertical axis of the drag panel.

10. The tidal energy conversion assembly of claim 1, wherein the drag panel is a first of a plurality of drag panels.

11. The tidal energy conversion assembly of claim 10, wherein at least one of the plurality of drag panels is rotatable about a vertical axis.

12. The tidal energy conversion assembly of claim 1, wherein the drag panel has one or more non-flat sides configured to capture drag forces.

13. The tidal energy conversion assembly of claim 1, wherein the drag panel has a shape selected from the group consisting of: a parabolic shape, a concave shape, and a lofted cut.

14. The tidal energy conversion assembly of claim 1, further comprising a control mechanism which is configured to change the angle of the drag panel in the water in relation to the direction of water flow.

15. The tidal energy conversion assembly of claim 1, wherein the anchor cable passes through at least one anchor member secured to the bed of a body of water between the displacement vessel and the directional converter.

16. The tidal energy conversion assembly of claim 1, wherein the drag panel comprises one or more rotatable sub-panels.

17. The tidal energy conversion assembly of claim 1, wherein the control mechanism is configured to pivot the drag panel at an angle which is from 0 degrees to at least 90 degrees relative to the displacement vessel.

18. The tidal energy conversion assembly of claim 1, wherein the anchor cable passes through at least one anchor member secured to the bed of a body of water between the displacement vessel and the directional converter.

19. A method of generating electricity using the flow of water due to tidal action, the method comprising:

providing a displacement vessel connected to an anchor cable which is coupled between said displacement vessel and a directional converter for activating a generator and which allows said displacement vessel to travel laterally in the direction of tidal flow, said displacement vessel including a drag panel positionable generally perpendicular to the tidal flow and pivotable about a horizontal axis by a control mechanism relative to the displacement vessel to pivot between an active configuration for maximizing the capture of drag forces acting on the drag panel, and a retracted configuration for minimizing the capture of drag forces acting on the drag panel, said directional converter and said generator positioned at a stationary location; and generating electricity by the generator as the displacement vessel travels laterally due to the tidal flow of water.

20. The method of claim 19, further comprising pivoting the drag panel such that the drag panel is substantially horizontal after generating electricity.

21. The method of claim 20, further comprising rewinding the anchor cable on the displacement vessel after pivoting said drag panel.

22. The method of claim 19, wherein the drag panel is pivotable about the horizontal axis of the displacement vessel at an angle which is greater than 0 degrees and less than or equal to 90 degrees.

23. The method of claim 19, wherein the directional converter and generator are part of a generator array comprising at least one directional converter coupled to at least one generator.

24. The method of claim 23, wherein the generator array is operatively coupled to the displacement vessel via the anchor cable.

25. The method of claim 19, wherein the anchor cable passes through at least one anchor member secured to the bed of a body of water between the displacement vessel and the directional converter.

26. A method of adjusting the amount of drag force experienced by a drag panel of a displacement vessel, the method comprising:

providing the displacement vessel in a body of water, wherein the displacement vessel is connected to an anchor cable which is coupled between the displacement vessel and a directional converter for activating a generator for generating electricity and which allows the displacement vessel to travel laterally in the direction of tidal flow, wherein the directional converter and generator are located at a stationary location; and pivoting the drag panel by an angle about a horizontal axis of the displacement vessel by a control mechanism to thereby adjust the amount of drag force experienced by the drag panel, wherein the drag panel is positionable generally perpendicular to the tidal flow and is pivotable from an active configuration for maximizing the capture of drag forces acting on the drag panel, to a retracted configuration for minimizing the capture of drag forces acting on the drag panel.

27. The method of claim 26, wherein the angle is greater than 0 degrees and less than or equal to 90 degrees.

28. The method of claim 27, wherein decreasing the angle between the drag panel and the displacement vessel decreases the amount of drag force experienced by the drag panel.

29. The method of claim 27, wherein increasing the angle between the drag panel and the displacement vessel increases the amount of drag force experienced by the drag panel.

30. A tidal energy conversion assembly comprising:

a displacement vessel for lateral travel in the general direction of tidal flow;

a drag panel mounted to the displacement vessel for capturing drag forces caused by generally lateral tidal action, wherein the drag panel is controllably pivotable about a horizontal axis from an active configuration for maximizing the capture of drag forces acting on the drag panel, to a retracted configuration for minimizing the capture of drag forces acting on the drag panel, in order to maintain a desired amount of drag on the drag panel;

a control mechanism operatively coupled to the drag panel to pivot the drag panel;

a generator array comprising at least one directional converter operatively coupled to at least one generator, wherein said directional converter and said generator are positioned on a platform;

an anchor cable having a first end, a second end, and a length in between the first end and the second end, wherein the first end of the anchor cable is coupled to the directional converter and the second end of the anchor cable is coupled to the displacement vessel;

wherein, as a result of its coupling to the anchor cable, said directional converter activates said generator to generate electricity when the displacement vessel travels laterally relative to said platform as a result of drag forces captured by said drag panel in the direction of tidal flow.

31. The tidal energy conversion assembly of claim 30, wherein the platform is a stationary location on land.

32. The tidal energy conversion assembly of claim 30, wherein the platform is anchored to the earth or the bed of a body of water.

33. The tidal energy conversion assembly of claim 30, wherein the platform is a mobile platform.

34. The tidal energy conversion assembly of claim 33, wherein the anchor cable passes through at least one anchor member secured to the bed of a body of water between the displacement vessel and the directional converter.

35. The tidal energy conversion assembly of claim 30, wherein the generator array comprises a plurality of directional converters coupled to the displacement vessel and a plurality of anchor cables coupled to said displacement vessel and to one of said directional converters, and each directional converter being coupled to at least one generator to activate its respective generator as a result of its coupling to a respective anchor cable.

36. The tidal energy conversion assembly of claim 30, wherein the assembly further comprises one or more control cables for adjusting the angle of the drag panel relative to tidal water flow, each control cable connected to the displacement vessel at a respective connection point.

37. The tidal energy conversion assembly of claim 30, wherein the directional converter comprises a rotatable drum fixed on an axle, and at least a portion of the anchor cable is wound around the drum.

38. The tidal energy conversion assembly of claim 37, wherein the directional converter comprises a gear box operatively coupled to the drum, wherein the gear box converts an input RPM applied by said anchor cable into an output RPM that is different than the input RPM, and the generator is operatively coupled to the gear box for actuation at the output RPM.

39. The tidal energy conversion assembly of claim 38, wherein the anchor cable causes the drum to rotate and thereby generate mechanical energy as the anchor cable unwinds, and the mechanical energy is transmitted to the generator for producing electrical energy.

40. The tidal energy conversion assembly of claim 37, further comprising a pair of rotatable drums, wherein a first drum is engaged with the generator to produce electricity when the displacement vessel drifts in one direction, and a second drum is engaged with the generator to produce electricity when the displacement vessel drifts in a different direction.

41. The tidal energy conversion assembly of claim 30, further comprising a control mechanism configured to pivot the drag panel about its horizontal axis.

42. The tidal energy conversion assembly of claim 30, further comprising a control mechanism configured to pivot the drag panel about a vertical axis at an angle in relation to the direction of water flow.

43. The tidal energy conversion assembly of claim 30, wherein the drag panel has one or more non-flat sides configured to capture drag forces when oriented to face the tidal water flow.

44. The tidal energy conversion assembly of claim 43, wherein the drag panel has a parabolic shape, a concave shape, or a lofted cut.

45. The tidal energy conversion assembly of claim 30, wherein the anchor cable passes through at least one anchor member secured to the bed of a body of water between the displacement vessel and the directional converter.

46. The tidal energy conversion assembly of claim 45, further comprising a connection mechanism which disconnects the anchor cable from a first anchor member, translates relative to the bed of the body of water, and reconnects the anchor cable to a second anchor member.

47. The tidal energy conversion assembly of claim 30, wherein the platform is the displacement vessel.

48. A method of generating electricity using the flow of water due to tidal action, the method comprising:
  (a) providing a displacement vessel in the tidal flow of water, said displacement vessel comprising a drag panel mounted to the displacement vessel and structurally configured and oriented to capture drag forces due to tidal water flow acting on said drag panel as the displacement vessel travels in a generally lateral direction with respect to a stationary location, the drag panel being controllably pivotable about a horizontal axis Ly a control mechanism to maintain a desired amount of drag force acting on the drag panel between an active configuration for maximizing the capture of drag forces acting on the drag panel, and a retracted configuration for minimizing the capture of drag forces acting on the drag panel; and
  (b) generating electricity by a generator array as the displacement vessel travels laterally due to the flow of water, wherein:
  the generator array comprises at least one directional converter coupled to at least one generator and is positioned at the stationary location which is land, the generator array coupled to the displacement vessel or the drag panel via an anchor cable; and
  said directional converter activating its said generator to generate electricity when the displacement vessel travels laterally relative to said stationary location as a result of drag forces captured by said drag panel in the direction of tidal flow.

49. The method according to claim 48, wherein the anchor cable has a first end connected to the directional converter and a second end connected to the displacement vessel, and the anchor cable passes through at least one anchor member secured to the bed of a body of water between the displacement vessel and the directional converter.

50. A method of generating electricity from the flow of water in a current, the method comprising:
  providing into the water a displacement vessel in a flow of water, said displacement vessel being connected to an anchor cable, said displacement vessel comprising a drag panel mounted thereon and pivotable about a horizontal axis of the displacement vessel by a control mechanism, wherein the drag panel extends at an angle with respect to a surface of the water and is pivotable from an active configuration for maximizing the drag forces captured by the drag panel, to a retracted configuration for minimizing the drag forces captured by the drag panel, said anchor cable coupled between said displacement vessel and a generator array positioned at a stationary location; and
  generating electricity by the generator array as the displacement vessel travels laterally away from said generator array due to the drag forces acting on said drag panel.

51. The method according to claim 50, wherein the anchor cable passes through at least one anchor member secured to the bed of a body of water between the displacement vessel and the generator array.

* * * * *